(12) United States Patent
Mizuhata et al.

(10) Patent No.: US 12,034,185 B2
(45) Date of Patent: Jul. 9, 2024

(54) METAL AIR BATTERY MODULE

(71) Applicant: SHARP KABUSHIKI KAISHA, Sakai (JP)

(72) Inventors: Hirotaka Mizuhata, Sakai (JP); Tomo Kitagawa, Sakai (JP); Toyoka Aimoto, Sakai (JP); Akihito Yoshida, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 493 days.

(21) Appl. No.: 17/272,211

(22) PCT Filed: Jul. 16, 2019

(86) PCT No.: PCT/JP2019/027909
§ 371 (c)(1),
(2) Date: Feb. 26, 2021

(87) PCT Pub. No.: WO2020/044823
PCT Pub. Date: Mar. 5, 2020

(65) Prior Publication Data
US 2021/0313660 A1 Oct. 7, 2021

(30) Foreign Application Priority Data

Aug. 31, 2018 (JP) ................................. 2018-163005
Aug. 31, 2018 (JP) ................................. 2018-163008
Aug. 31, 2018 (JP) ................................. 2018-163009

(51) Int. Cl.
*H01M 50/536* (2021.01)
*H01M 12/08* (2006.01)
(Continued)

(52) U.S. Cl.
CPC ......... *H01M 50/536* (2021.01); *H01M 12/08* (2013.01); *H01M 50/204* (2021.01);
(Continued)

(58) Field of Classification Search
None
See application file for complete search history.

(56) References Cited

U.S. PATENT DOCUMENTS

2010/0248010 A1* 9/2010 Butt ..................... H01M 10/42
429/160
2011/0059355 A1* 3/2011 Zhang ................. H01M 4/8652
429/188
(Continued)

FOREIGN PATENT DOCUMENTS

CN 104885255 A 9/2015
GB 1242832 A 8/1971
(Continued)

OTHER PUBLICATIONS

Machine English Translation of JPS5772561U originally published to Sanyo Electric Co., Ltd. May 1982 (Year: 1982).*
(Continued)

*Primary Examiner* — Ula C Ruddock
*Assistant Examiner* — Mary Grace Byram
(74) *Attorney, Agent, or Firm* — ScienBiziP, P.C.

(57) ABSTRACT

A metal-air battery module includes a unit assembly having a plurality of battery units coupled using first couplers. Each battery unit has a metal-air battery cell held by a sheet. In the unit assembly, two of the metal-air battery cells adjacent to each other are arranged in such a manner that a negative-electrode terminal and an air-electrode terminal face each other, and the facing terminals are connected together to form a pair of connected terminals. In the pair of connected terminals, the negative-electrode terminal and the air-electrode terminal are connected through welding or other methods.

13 Claims, 22 Drawing Sheets

(51) Int. Cl.
*H01M 50/204* (2021.01)
*H01M 50/211* (2021.01)
*H01M 50/264* (2021.01)
*H01M 50/289* (2021.01)
*H01M 50/291* (2021.01)
*H01M 50/293* (2021.01)
*H01M 50/298* (2021.01)
*H01M 50/50* (2021.01)
*H01M 50/514* (2021.01)
*H01M 50/516* (2021.01)
*H01M 50/572* (2021.01)
*H01M 50/574* (2021.01)
*H01M 50/588* (2021.01)
*H01M 50/595* (2021.01)
*H01M 50/51* (2021.01)
*H01M 50/55* (2021.01)

(52) U.S. Cl.
CPC ....... *H01M 50/211* (2021.01); *H01M 50/264* (2021.01); *H01M 50/289* (2021.01); *H01M 50/291* (2021.01); *H01M 50/293* (2021.01); *H01M 50/298* (2021.01); *H01M 50/50* (2021.01); *H01M 50/514* (2021.01); *H01M 50/516* (2021.01); *H01M 50/574* (2021.01); *H01M 50/588* (2021.01); *H01M 50/595* (2021.01); *H01M 50/51* (2021.01); *H01M 50/55* (2021.01)

(56) References Cited

U.S. PATENT DOCUMENTS

| 2014/0080012 | A1* | 3/2014 | Minami | H01M 12/02 429/403 |
| 2015/0357609 | A1* | 12/2015 | Lang | B60L 53/16 320/113 |
| 2015/0372353 | A1* | 12/2015 | Ryu | H01M 10/0436 429/61 |
| 2018/0079548 | A1 | 3/2018 | Youell et al. | |

FOREIGN PATENT DOCUMENTS

| JP | S47-010027 U | 10/1972 |
| JP | S57-072561 U | 5/1982 |
| JP | S5772561 U * | 9/1982 |
| JP | 2014078498 A | 5/2014 |
| JP | 5690443 B1 | 3/2015 |
| JP | 2015060666 A | 3/2015 |
| WO | 2017/002815 A1 | 1/2017 |
| WO | 2017/159469 A1 | 9/2017 |

OTHER PUBLICATIONS

English machine translation of JP2014078498A from Espacenet (Year: 2014).*
English machine translation of WO2017159469A1 from Espacenet (Year: 2017).*
Gelston, John, The Benefits of Structural Foam Molding in Plastic Injection Projects, AIM Processing Small Plastic Parts Blog, Apr. 8, 2016 (Year: 2016).*
English machine translation of WO201506066A1 from Espacenet (Year: 2015).*

* cited by examiner

FIG.3
(a)
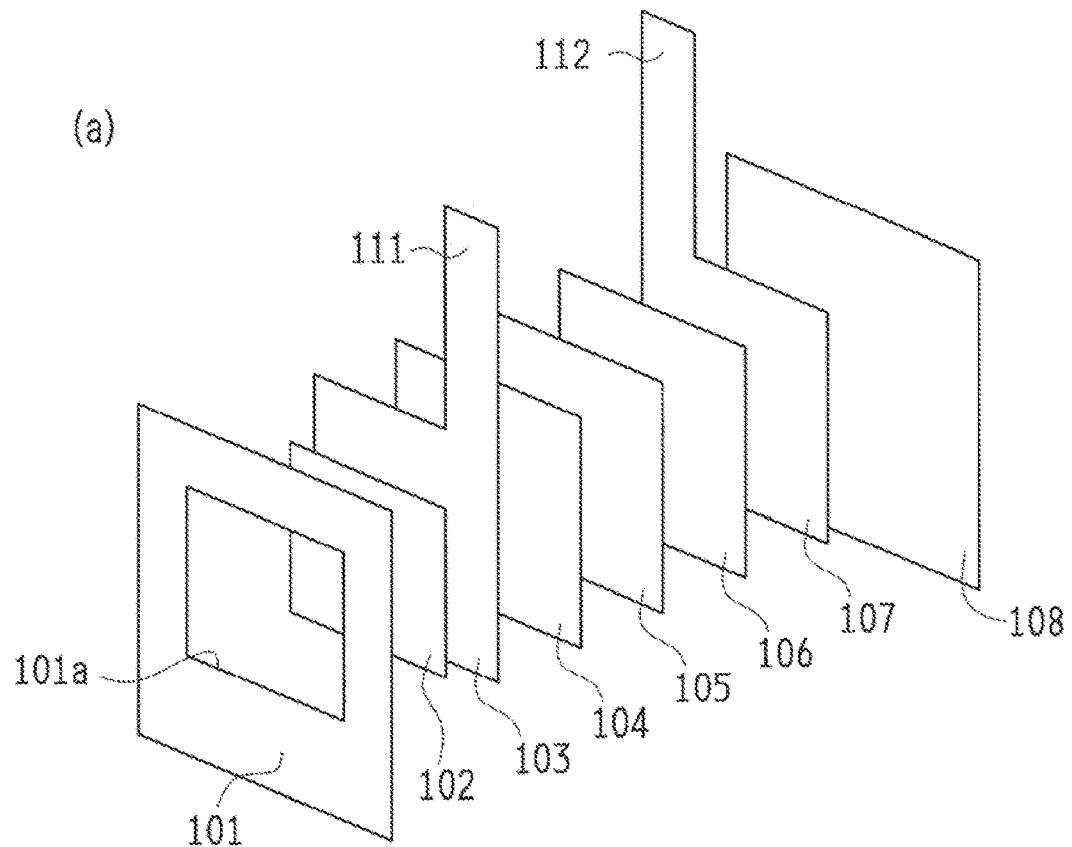
(b)
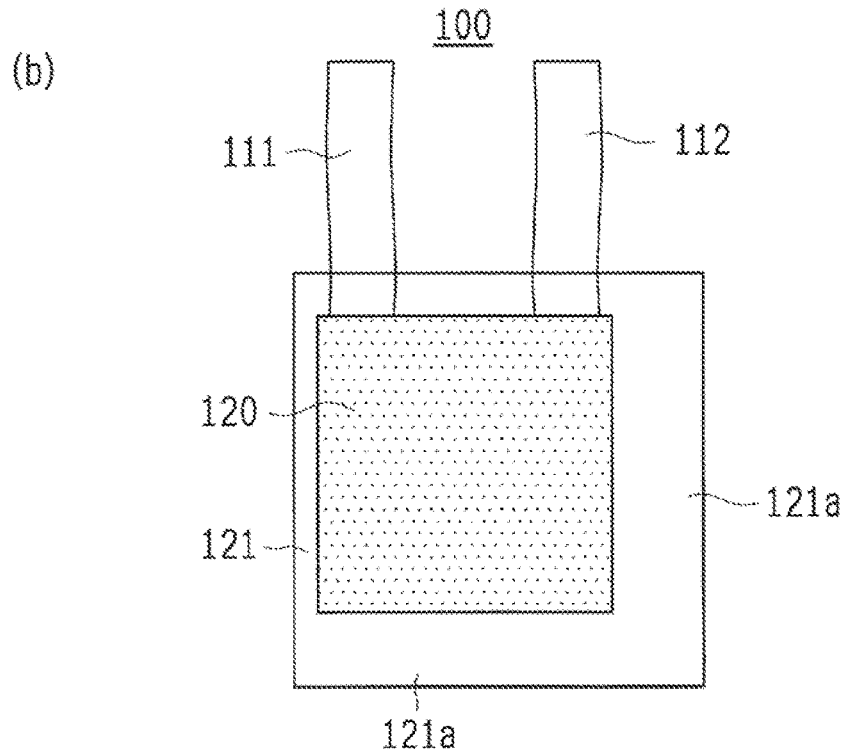

FIG.6
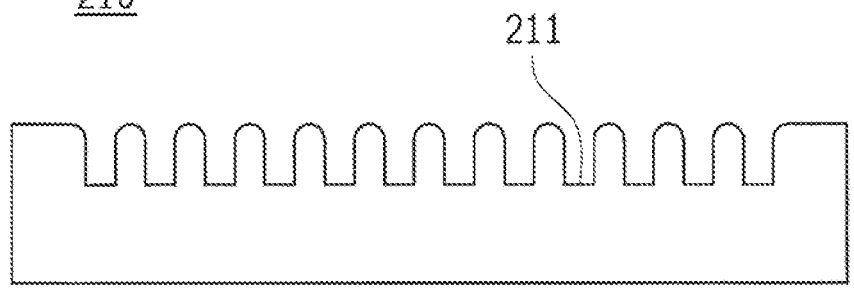
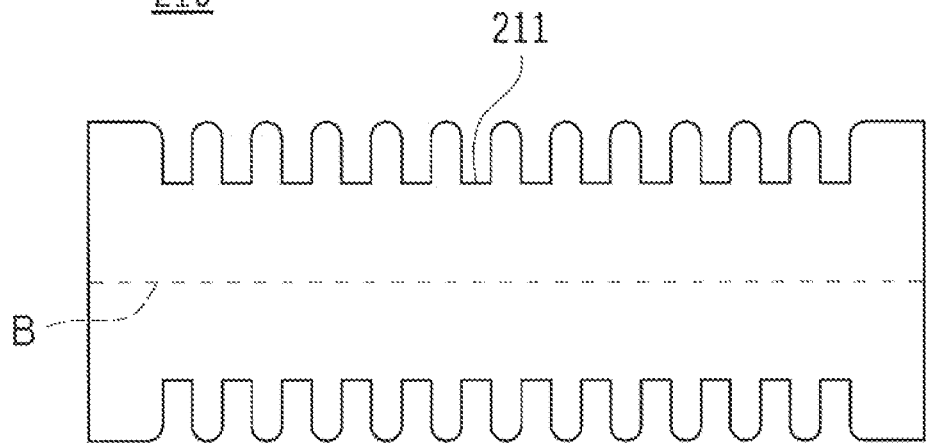

FIG.14
(a) DURING CHARGE
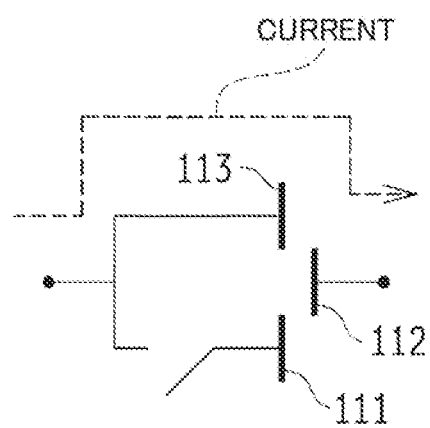
(b) DURING DISCHARGE
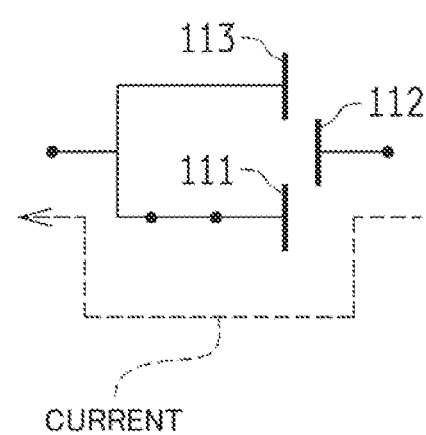

FIG.21
(a)
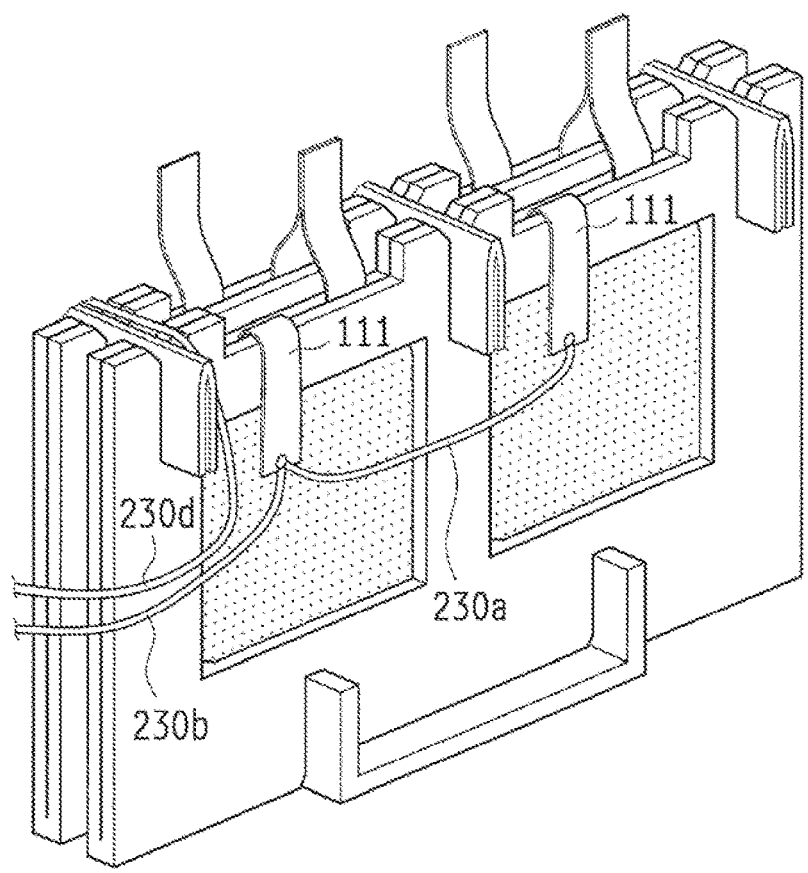
(b)
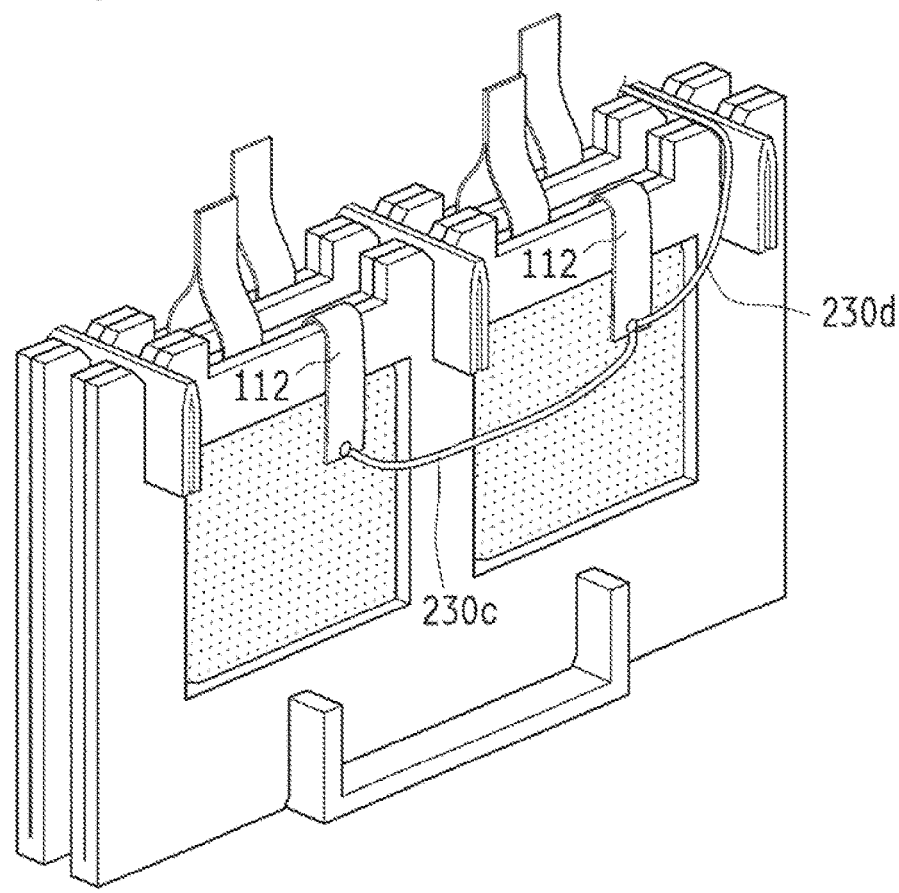

FIG.22
(a)
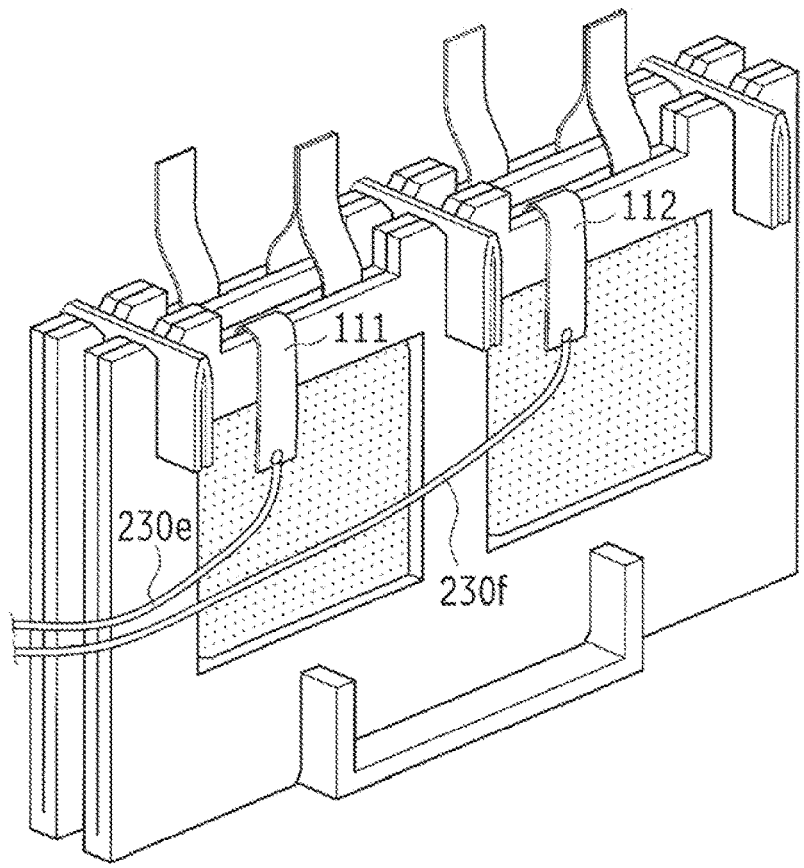
(b)
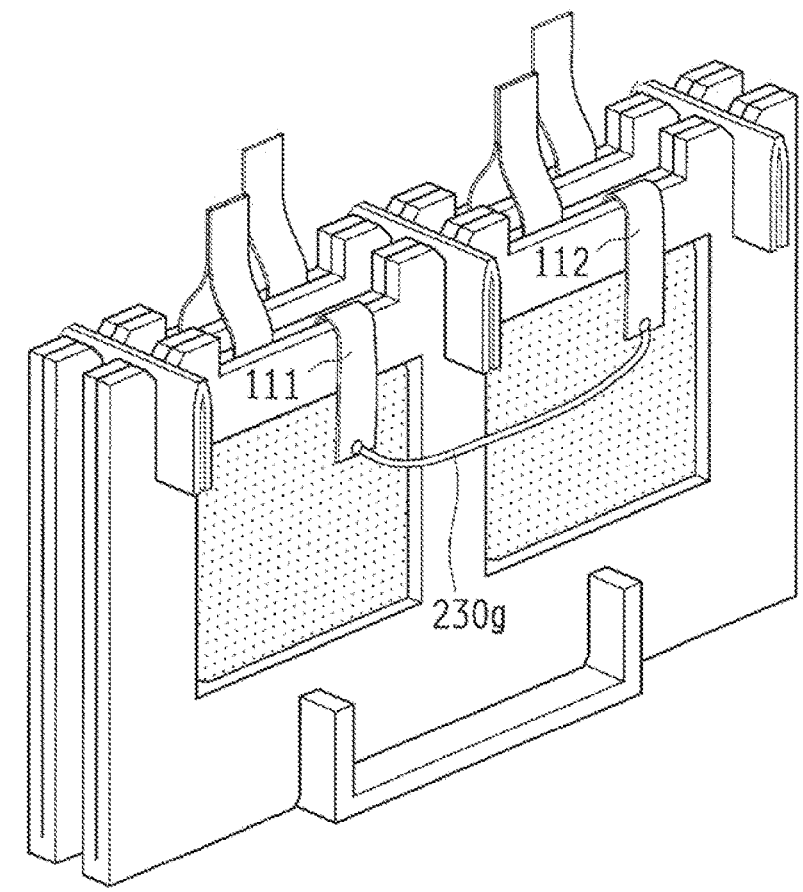

METAL AIR BATTERY MODULE

TECHNICAL FIELD

The present disclosure relates to a metal-air battery module that includes a plurality of metal-air battery cells brought together into a module.

BACKGROUND ART

A metal-air battery that requires greater electromotive force and greater battery capacity uses a plurality of battery cells connected in series or in parallel. In this case, these connected battery cells are housed in a casing to form a module so as to be handled easily. A battery cell, such as a laminated battery cell composed of a laminate sheet as a sheathing cover, in particular, which does not stand on its own, needs to be housed in a casing to hold the battery cells at predetermined intervals.

Patent Literature 1 discloses a metal-air battery module that includes a plurality of battery cells housed in a casing together with spacers.

CITATION LIST

Patent Literature

Patent Literature 1: Japanese Patent No. 5690443

SUMMARY OF INVENTION

Technical Problem

In the metal-air battery module in Patent Literature 1, the battery cells housed in the casing are electrically connected together via wire cords (electric cover wires). That is, the wire cords extend from terminals of the individual battery cells, thus forming an electrical circuit.

Connecting together such arranged battery cells using wire cords involves complex wiring in a circuit. The complex wiring tends to cause a wire break and a short circuit. In addition, the electrical connection using the wire cords involves intricate wiring.

To solve these problems, it is an object of the present disclosure to provide a metal-air battery module that includes a plurality of battery cells connectable together with a simple structure and a simple method.

Solution to Problem

To solve the above problems, a metal-air battery module according to a first aspect of the present disclosure includes at least one battery-cell row including a plurality of metal-air battery cells connected in series. Each of the plurality of metal-air battery cells is a two-electrode system-based metal-air battery having a negative-electrode terminal and an air-electrode terminal. In the at least one battery-cell row, two of the plurality of metal-air battery cells adjacent to each other are arranged in such a manner that the negative-electrode terminal and the air-electrode terminal face each other. In the two of the plurality of metal-air battery cells adjacent to each other, the negative-electrode terminal of one metal-air battery cell is connected to the air-electrode terminal of the other metal-air battery cell to constitute a pair of connected terminals. The negative-electrode terminal and the air-electrode terminal of the pair of connected terminals are directly connected together.

To solve the above problems, a metal-air battery module according to a second aspect of the present disclosure includes at least one battery-cell row including a plurality of metal-air battery cells connected in series. Each of the plurality of metal-air battery cells is a three-electrode system-based metal-air battery having a negative-electrode terminal, an air-electrode terminal, and a charge-electrode terminal. In the at least one battery-cell row, two of the plurality of metal-air battery cells adjacent to each other are arranged in such a manner that the negative-electrode terminal and the charge-electrode terminal face each other. In the two of the plurality of metal-air battery cells adjacent to each other, the negative-electrode terminal of one metal-air battery cell is connected to the charge-electrode terminal of the other metal-air battery cell to constitute a pair of connected terminals. The air-electrode terminal and the charge-electrode terminal of each of the plurality of metal-air battery cells are connected via a switching element. The negative-electrode terminal and the charge-electrode terminal of the pair of connected terminals are directly connected together.

In the aforementioned configurations, the adjacent metal-air battery cells are arranged in such a manner that the negative-electrode terminal and the air-electrode terminal (or the charge-electrode terminal) face each other, and the negative-electrode terminal and the air-electrode terminal (or the charge-electrode terminal) constituting the pair of connected terminals are directly connected together through welding or other methods. Such a terminal connection structure offers a more simplified wire path than a conventional structure, where terminals are connected using wire cords, thus improving a possible wire break and a possible short circuit. This terminal connection structure can also improve the workability of terminal connection.

Advantageous Effect of Invention

In the metal-air battery modules of the present disclosure, the adjacent metal-air battery cells are arranged in such a manner that the negative-electrode terminal and the air-electrode terminal (or the charge-electrode terminal) face each other, and the facing terminals are directly connected together through welding or other methods. Such a configuration offers a simplified wire path, thus improving a possible wire break and a possible short circuit. This configuration can also improve the workability of terminal connection.

BRIEF DESCRIPTION OF DRAWINGS

FIG. 3 illustrates a battery cell included in the battery unit. FIG. 3(a) is an exploded perspective view of the battery cell. FIG. 3(b) is a plan view of the battery cell.

FIGS. 6(a) and (b) are plan views of a first coupler used in the unit assembly in FIG. 5.

FIG. 14 illustrates a circuit configuration of the three-electrode system-based battery cell. FIG. 14(a) illustrates the circuit configuration during charge. FIG. 14(b) illustrates the circuit configuration during discharge.

FIG. 15(a) is a plan view of a plurality of battery cells connected in series, viewed from where terminals are located. FIG. 15(b) is a perspective view of the connection between terminals of two adjacent battery cells. FIG. 15(c) illustrates a configuration of a connection substrate used for connecting the battery cells.

FIGS. 21(a) and (b) illustrate how to connect wire cords in connecting two battery-cell rows in parallel.

FIGS. 22(a) and (b) illustrate how to connect wire cords in connecting the two battery-cell rows in series.

DESCRIPTION OF EMBODIMENTS

First Embodiment

Structure of Battery Unit

Figure 2:
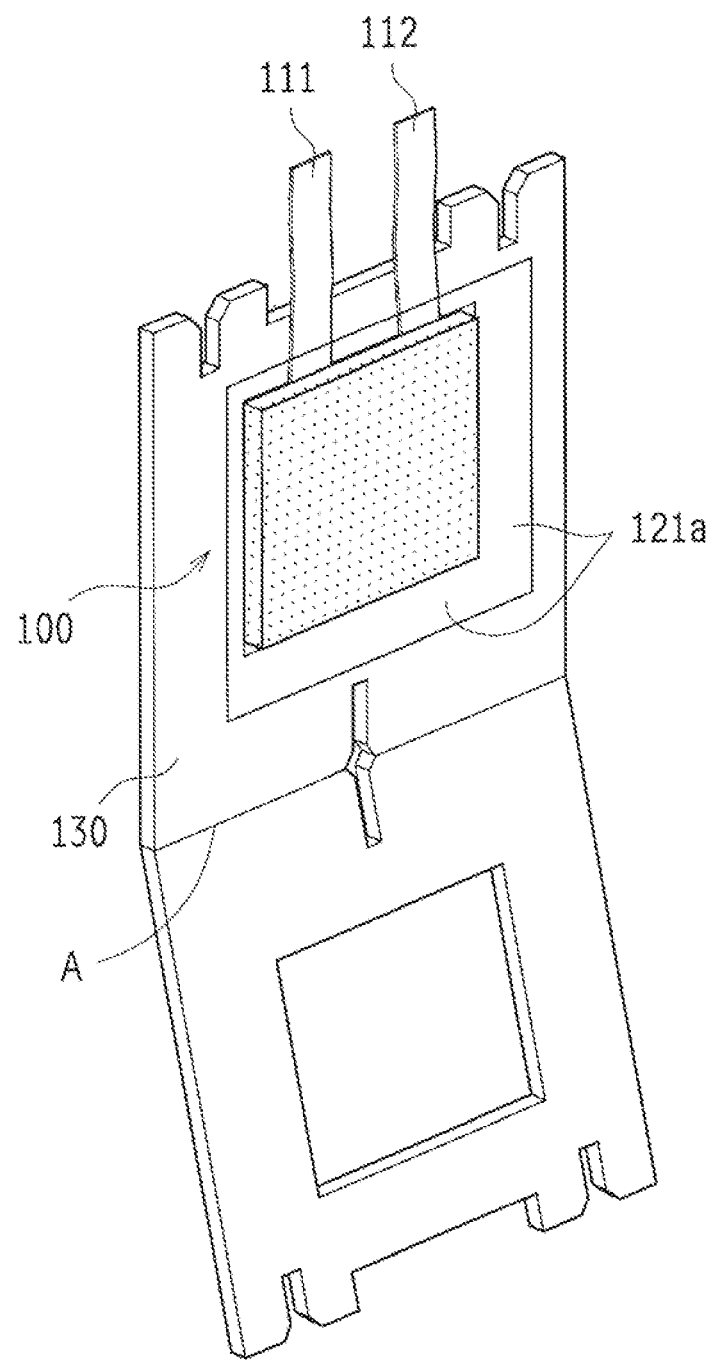
FIG. 2 is an exploded perspective view of the battery unit in FIG. 1.

Embodiments of the present disclosure will be detailed with reference to the drawings. The following describes the structure of battery units 10 that are used in a metal-air battery module 30 (see FIG. 9) of the present disclosure. A single battery unit 10 includes a metal-air battery cell 100 (hereinafter merely referred to as a battery cell 100) and a sheet (retainer) 130. The battery unit 10 is structured in such a manner that the sheet 130 folded in two sandwiches both surfaces of the battery cell 100, as illustrated in FIG. 2.

The battery cell 100 is a laminated metal-air battery cell, and is structured in such a manner that, as illustrated in FIG. 3(a), a laminate material 101, a water-repellent film 102, a positive-electrode current collector 103, a positive-electrode active material layer 104, a separator 105, a negative-electrode active material layer 106, a negative-electrode current collector 107, and a laminate material 108 are laminated in this order. Although a metal-air battery cell, whose configuration is publicly known, will not be elaborated upon here, the positive electrode of a metal-air battery is an air electrode, and thus the laminate material 101, which is close to the positive electrode, has an opening 101a for allowing air to pass.

FIG. 3(b) is a plan view of the battery cell 100 with the components in FIG. 3(a) joined together. The laminate materials 101 and 108 are larger in area than the other components. The laminate materials 101 and 108 are welded together on their surrounding four sides with the other components interposed therebetween, thus sealing the inside of the battery cell 100. The battery cell 100 thus has a welded region 121 in which only the laminate materials 101 and 108 are laminated. The welded region 121 surrounds the four sides of a laminated region 120 in which the water-repellent film 102, the positive-electrode current collector 103, the positive-electrode active material layer 104, the separator 105, the negative-electrode active material layer 106, and the negative-electrode current collector 107 are laminated. It is noted that the battery cell 100 is manufactured through the following process steps: welding three of the sides of the laminate materials 101 and 108 to form a bag (at this point, the other components are welded to the laminate materials 101 and 108), followed by pouring an electrolytic solution from the not yet welded sides, followed by welding these remaining sides.

The laminate materials 101 and 108 preferably have a joining edge 121a disposed on at least one side of the welded region 121 and is wider than the other sides. The joining edge 121a is a portion that is joined to the sheet 130 when the battery cell 100 is inserted into the sheet 130. The joining edge 121a is provided to enable the battery cell 100 to be positioned and fixed to the sheet 130. Although the joining edge 121a is disposed on the right and lower sides of the battery cell 100 in FIG. 3(b), the joining edge 121a may be disposed on any side.

The positive-electrode current collector 103 and the negative-electrode current collector 107 respectively have an air-electrode terminal 111 and a negative-electrode terminal 112. These terminals protrude outside further than the welded region 121, on one side (in FIG. 3, the upper side) of the battery cell 100. That is, the air-electrode terminal 111 and the negative-electrode terminal 112 are foil electrode terminals extending so as to protrude outside from one side of the battery cell 100.

Figure 4:
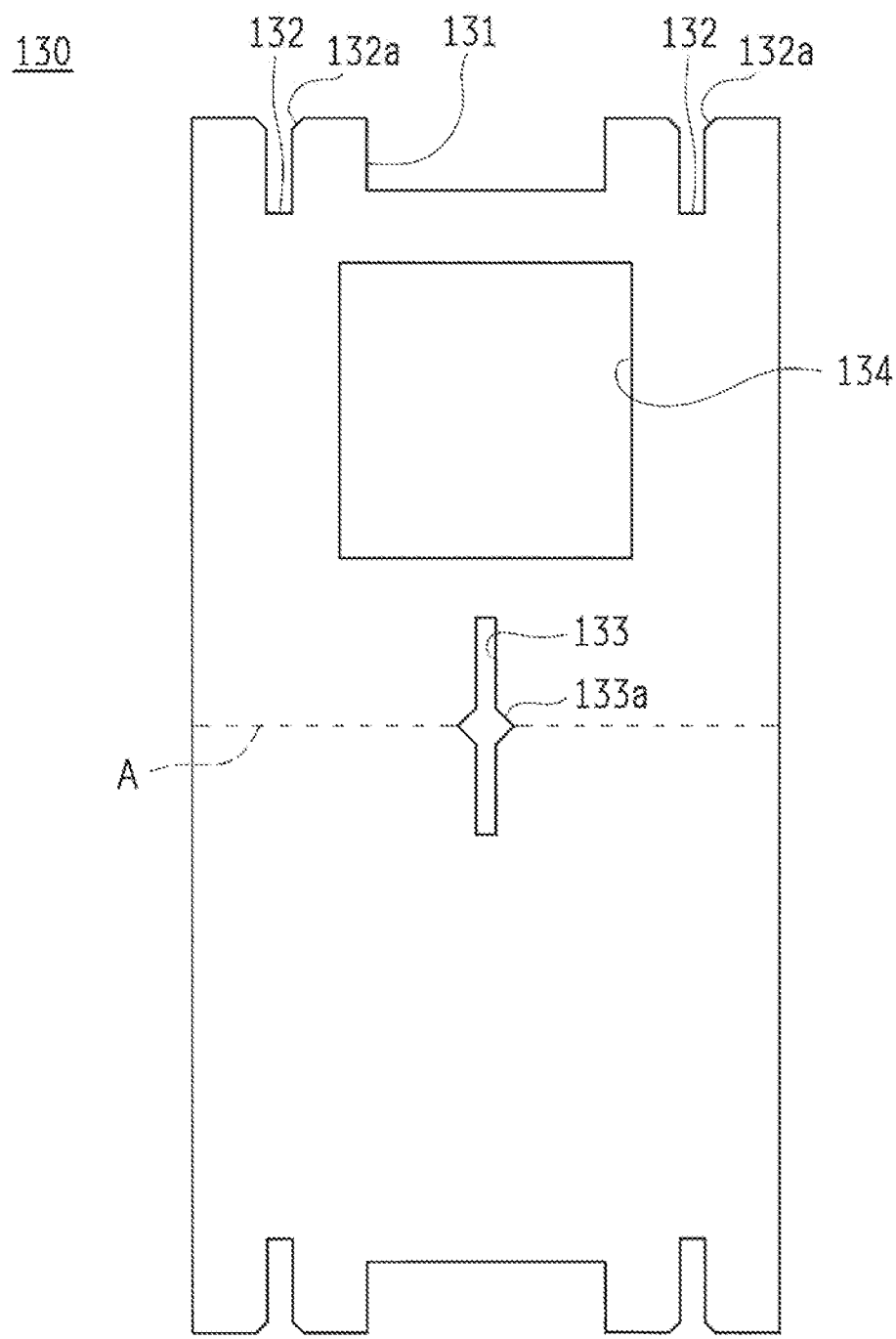
FIG. 4 is a developed view of a sheet before being folded, included in the battery unit in FIG. 1.

FIG. 4 is a developed view of the sheet 130 before being folded. Although the sheet 130 is made of any material, a foamable resin sheet is preferably used in view of weight reduction, strength, corrosion resistance, and other aspects. The sheet 130 is substantially symmetric about a folding line A, and the sheet perimeters on both sides completely coincide when the sheet 130 is folded along the folding line A. Reference will be made to the upper part of folding line A in FIG. 4. For convenience in description, a side coinciding with the folding line A will be referred to as a lower side, and a side opposite to the folding line A will be referred to as an upper side.

Disposed in the middle of the upper side of the sheet 130 is a rectangular first cut (cut for terminal placement) 131. Disposed at the first cut 131 are the air-electrode terminal 111 and the negative-electrode terminal 112 of the battery cell 100, in the battery unit 10 shown in FIG. 1. Disposed near both ends on the upper side of the sheet 130 are groove-shaped second cuts 132. Each second cut 132 has chamfered portions 132a disposed on both sides of an end near its opening. Disposed in the middle on the lower side of the sheet 130 is a groove-shaped third cut 133. The third cut 133 is a slit-shaped opening when the sheet 130 is developed, and is turned into a groove-shaped cut when the sheet 130 is folded. The third cut 133 has chamfered portions 133*a* disposed on both sides of an end near its opening.

Figure 1:
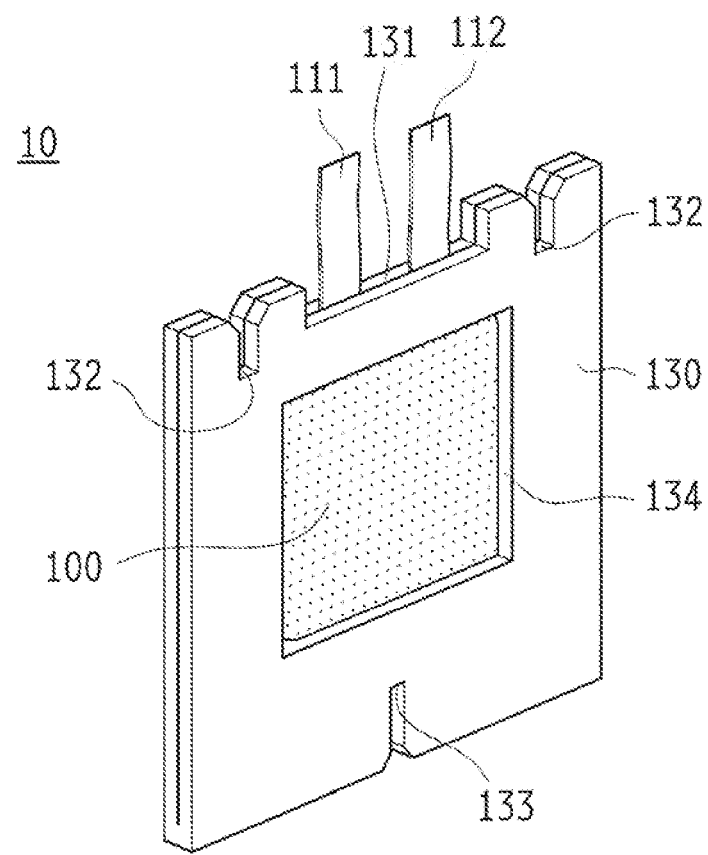
FIG. 1 is a perspective view of a battery unit according to a first embodiment.

Referring to the battery unit 10 in FIG. 1, disposed in the middle of the sheet 130 is a rectangular opening 134. The opening 134 corresponds to the laminated region 120 of the battery cell 100, and is disposed in a location overlapping the air electrode of the battery cell 100. Referring to the sheet 130 in FIG. 4, the opening 134 is disposed in only one of two parts divided by the folding line A (in FIG. 4, the upper part of the folding line A). In the battery unit 10, the laminated region 120 of the battery cell 100 is located in the opening 134, and the welded region 121 and part of the air-electrode terminal 111 and negative-electrode terminal 112 are sandwiched by the sheet 130. As described above, the distal ends of the air-electrode terminal 111 and negative-electrode terminal 112 are exposed to the outside at the first cut 131. The opening 134 provides an air path for supplying air to the battery cell 100. That is, the battery cell 100 is placed in such a manner that its air electrode faces the first opening 134 of the sheet 130. Although the first opening 134 may have any size, the first opening 134 is preferably smaller than the area of the laminated region 120, which faces the first opening 134, and the sheet 130 preferably covers part of the laminated region 120, preferably, the end of the laminated region 120. That is, the sheet 130 can prevent the battery cell 100 from a deformation or expansion resulting from repeated charge and discharge, and can prevent the battery cell 100 from a bend resulting from a stress that is applied to terminals when the terminals are connected, which will be described later on.

Structure of Unit Assembly

Figure 5:
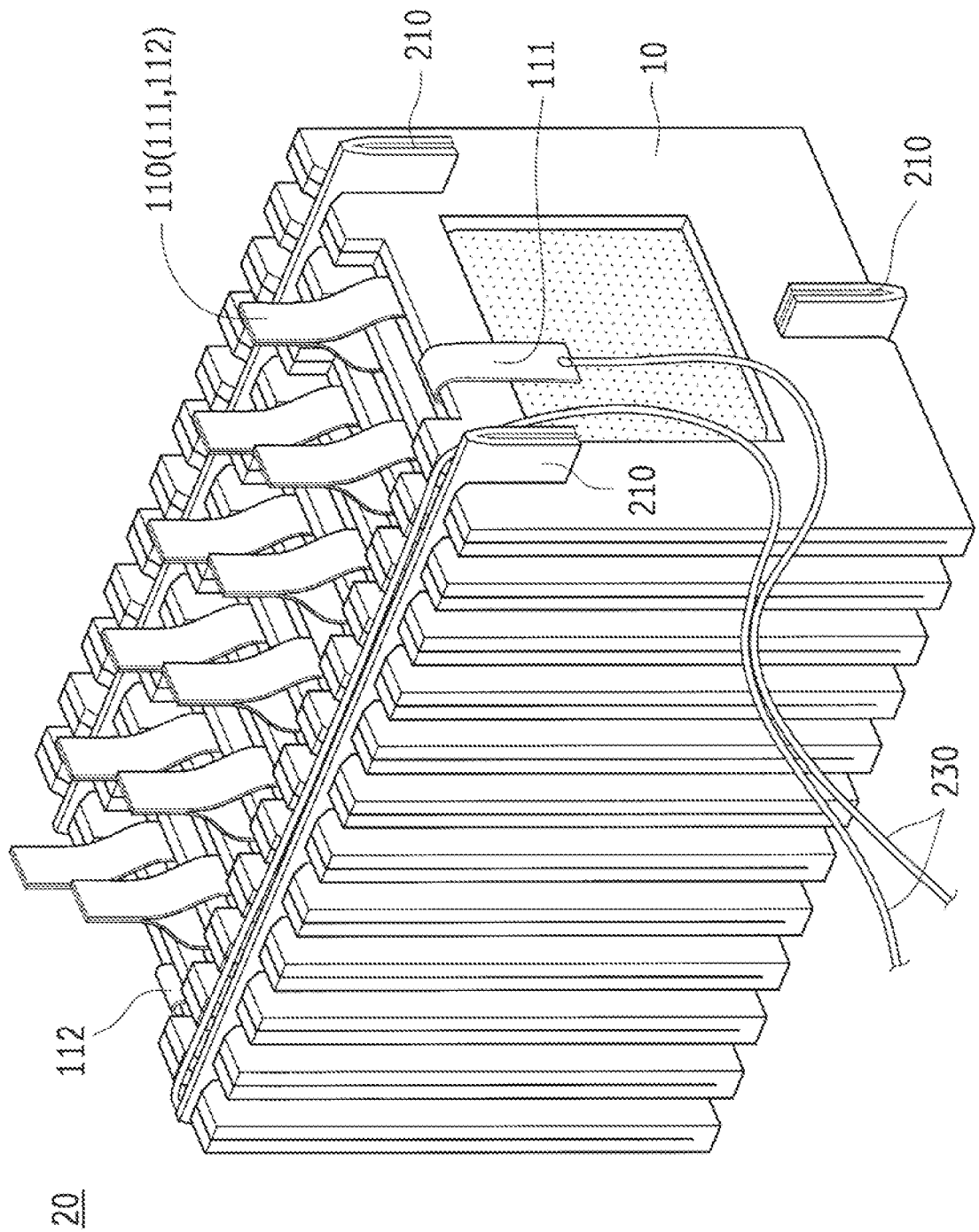
FIG. 5 is a perspective view of the structure of a unit assembly using the battery unit in FIG. 1.

The metal-air battery module 30 incorporates a plurality of battery units 10, which are coupled together with couplers to constitute a unit assembly 20. FIG. 5 is a perspective view of the structure of the unit assembly 20 using the battery unit 10 shown in FIG. 1. The unit assembly 20 in FIG. 5 couples the plurality of battery units 10 using three first couplers (couplers) 210.

Although the first couplers 210 are made of any material, a foamable resin sheet is preferably used, like the sheet 130. FIGS. 6(*a*) and (*b*) are plan views of each first coupler 210. The first coupler 210 may be composed of a single sheet as is, as illustrated in FIG. 6(*a*), or composed of a single sheet folded along a folding line B, as illustrated in FIG. 6(*b*).

The first coupler 210 has a comb shape with a plurality of groove-shaped fourth cuts 211 in the form of comb teeth arranged at predetermined intervals along one side in its longer-side direction. The fourth cuts may or may not be arranged at regular intervals. The unit assembly 20 includes any number of connectable battery units 10 as long as there are as many such battery units 10 as the fourth cuts 211 of the first coupler 210.

In the unit assembly 20, two of the first couplers 210 couple the battery units 10 on the upper side, and one of the first couplers 210 couples the battery units 10 on the lower side, as illustrated in FIG. 5. That is, on the upper sides of the battery units 10, the fourth cuts (second cuts for coupling) 211 of the first couplers 210 are fitted into the second cuts (first cuts for coupling) 132 of the battery units 10, and on the lower sides of the battery units 10, the fourth cuts (second cut for coupling) 211 of the first coupler 210 are fitted into the third cuts (first cuts for coupling) 133 of the battery units 10. On the upper surface of the unit assembly 20, the upper sides of the sheets 130 are preferably flush with the upper sides of the first couplers 210. Likewise, on the lower surface of the unit assembly 20, the lower sides of the sheets 130 are preferably flush with the lower side of the first coupler 210.

The unit assembly 20 includes a plurality of battery units 10 coupled and held at intervals at which the fourth cuts 211 of the first couplers 210 are arranged. This easily offers such a minimum gap as to form an air path, between the battery units 10 adjacent to each other. That is, the unit assembly 20 can have the plurality of battery units 10 (i.e., the plurality of battery cells 100) compactly arranged at narrow pitches, while allocating a sufficient air path. In addition, if there is a failure in any of the battery cells 100 of the unit assembly 20, the faulty battery cell 100 can be easily replaced including the battery unit 10.

Such a unit assembly 20, which can have the adjacent battery units 10 arranged at narrow pitches, facilitates terminal connection between the battery cells 100. In the unit assembly 20, the arrangement of the air-electrode terminal 111 and negative-electrode terminal 112 is reverse between the adjacent battery units 10. That is, the air-electrode terminal 111 of one of the battery units 10 faces the negative-electrode terminal 112 of the other battery unit 10, and the negative-electrode terminal 112 of one of the battery units 10 faces the air-electrode terminal 111 of the other battery unit 10. The air-electrode terminal 111 and the negative-electrode terminal 112 facing each other in such a manner, which are close to each other, can be directly connected together through welding or other methods, without using a wire cord. That is, the air-electrode terminal 111 and the negative-electrode terminal 112 are connected, thus constituting a pair of connected terminals 110 between the adjacent battery units 10. A method of connecting the pair of connected terminals 110 is not limited to welding; any other methods, such as soldering and grommet joining, that can directly connect the terminals together without using a wire cord can be used.

In the unit assembly 20 including the plurality of battery units 10 arranged in a row, the air-electrode terminal 111 of the battery unit 10 in the $(2i)^{th}$ place counted from one of the ends of the row is connected to the negative-electrode terminal 112 of the battery unit 10 in the $(2i-1)$th place; in this case, the air-electrode terminal 111 of the battery unit 10 in the $(2i+1)$th place counted from the end is connected to the negative-electrode terminal 112 of the battery unit 10 in the $(2i)^{th}$ place (herein, the alphabet i is equal to 1, 2, 3 . . . ). In other words, in a battery-cell row including a plurality of battery cells 100 connected in series, the negative-electrode terminal 112 of one of two adjacent battery cells 100 that is upstream of current is connected to the air-electrode terminal 111 of the other battery cell 100 that is downstream of current, thus constituting the pair of connected terminals 110 (this is because that inside a battery, current flows from the negative electrode toward the positive electrode). Such terminal connection enables the unit assembly 20 to include pairs of connected terminals 110 each consisting of the connected negative-electrode terminal 112 and air-electrode terminal 111, and alternately arranged on the right and left. This terminal connection enables the unit assembly 20 to include the plurality of battery units 10 connected in series. The air-electrode terminal 111 of the battery unit 10 at one end of the unit assembly 20 and the negative-electrode terminal 112 of the battery unit 10 at the other end do not form pairs of connected terminals 110; these terminals are connected to wire cords 230, thus constituting terminals for extracting power from the unit assembly 20. Alternatively, when secondary batteries are used as the battery cells 100, the battery cells 100 can accumulate electricity as well, using these power-extraction terminals.

Figure 7:
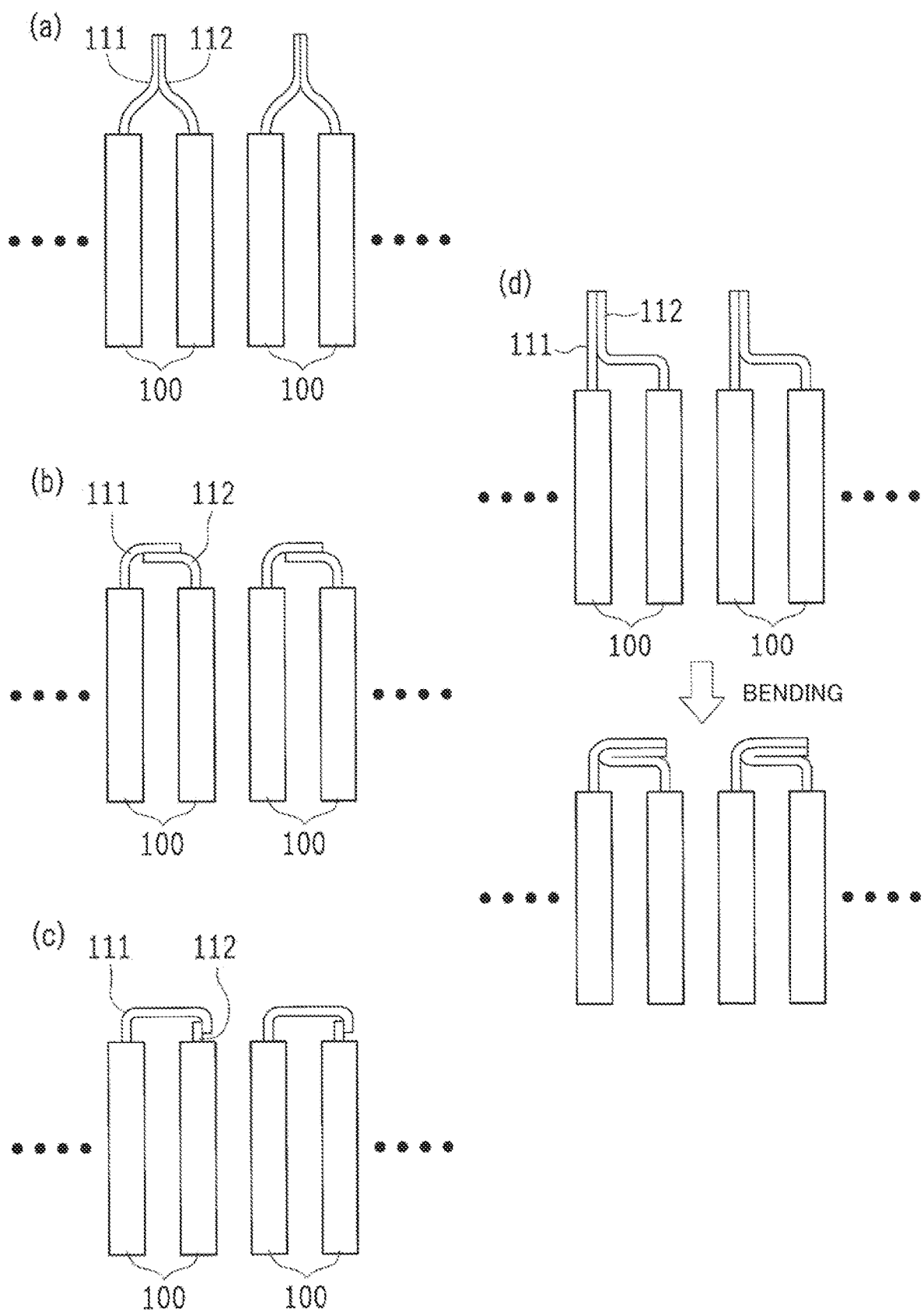
FIGS. 7(a) to (d) schematically illustrate, by way of example, how to connect a pair of connected terminals in the unit assembly in FIG. 5.

Connecting the pair of connected terminals 110 between the adjacent battery units 10 may use any method; FIGS. 7(a) to (d) illustrate example methods of the connection. The connection method in FIG. 7(a) is connecting the air-electrode terminal 111 and negative-electrode terminal 112 standing upward, with their surfaces facing each other. In the connection method in FIG. 7(a), there is no sheet 130, which constitutes an obstacle to the surroundings of the terminals when the two terminals are pinched using a resistance welding machine to be thus welded. The method in FIG. 7(a) thus offers high workability of welding. The connection method in FIG. 7(b) is bending the air-electrode terminal 111 and the negative-electrode terminal 112 inward so as to face each other, followed by overlaying one of the terminals on the other terminal, thus connecting these terminals. The connection method in FIG. 7(c) is forming one of the air-electrode terminal 111 and the negative-electrode terminal 112 to be longer than the other, followed by bending and then connecting the longer terminal to the shorter terminal. The connection methods in FIGS. 7(b) and (c) enable the terminals protruding from the battery unit 10 to be lowered, thereby offering a small battery. The connection method in FIG. 7(d) is connecting the air-electrode terminal 111 and negative-electrode terminal 112 standing upward, with their surfaces facing each other, to form the pair of connected terminals 110, followed by bending the pair of connected terminals 110. The connection method in FIG. 7(d) offers high workability of welding, and enables the terminals protruding from the battery unit 10 to be lowered.

Figure 8:
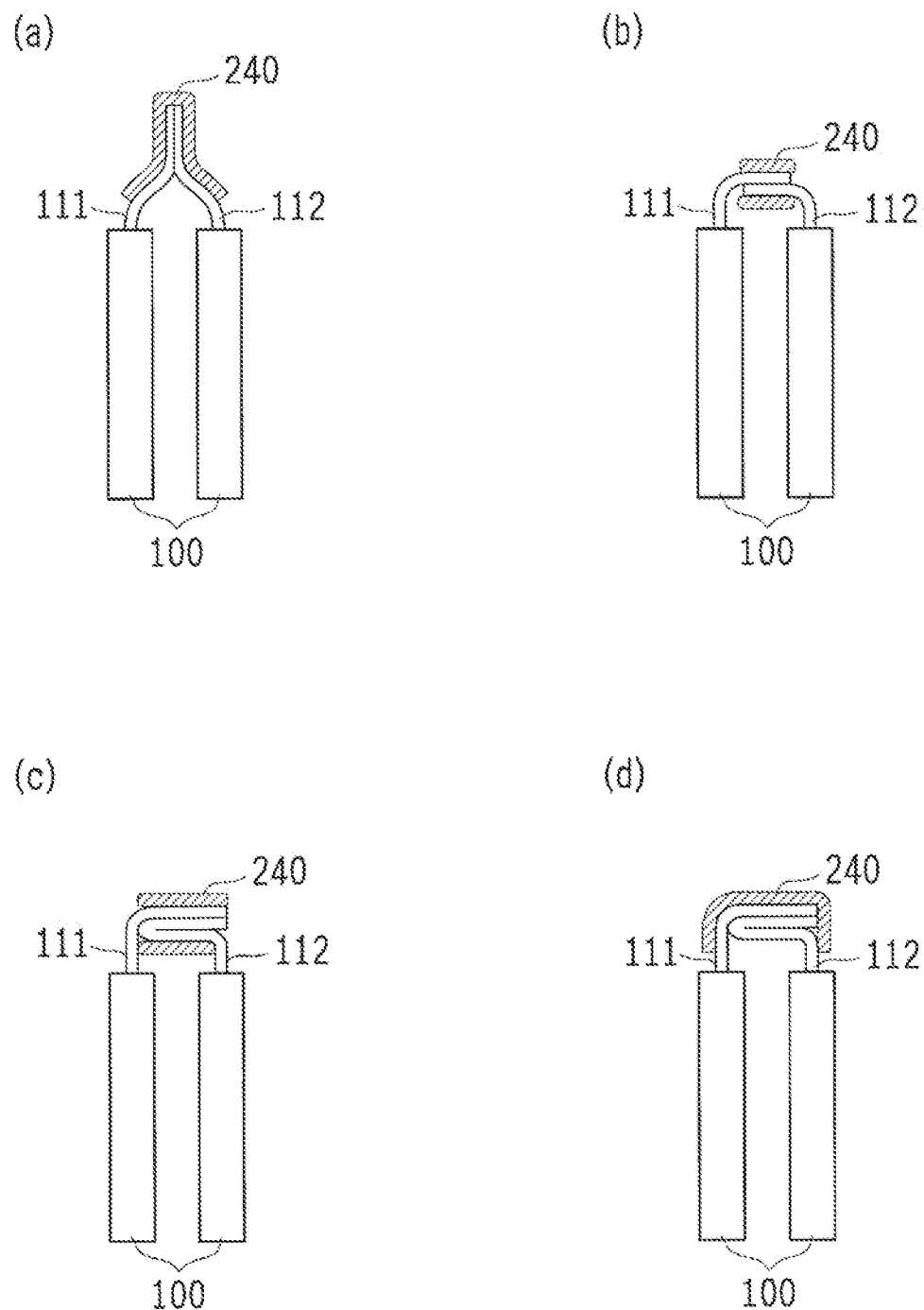
FIGS. 8(a) to (d) schematically illustrate, by way of example, covering the pair of connected terminals in the unit assembly in FIG. 5.

Each pair of connected terminals 110 is preferably covered with an insulating cover 240, as illustrated in FIGS. 8(a) to (d). The insulating cover 240 can be a strip of insulating tape having an adhesive layer on one side; this insulating tape can sandwich the pair of connected terminals 110, as illustrated in FIG. 8(a), can be wound around the pair of connected terminals 110, as illustrated in FIGS. 8(b) and (c), or can be attached onto the upper surface of the pair of connected terminals 110, as illustrated in FIG. 8(d). The insulating cover 240 has the following non-limiting functions:

Avoiding an electric shock and short circuit resulting from human contact to the exposed pair of connected terminals 110;

Avoiding a short circuit resulting from contact between the adjacent pairs of connected terminals 110; and Avoiding removal of a weld of the pair of connected terminals 110, resulting from corrosion of the weld and other factors caused by exposure of the weld.

As such, the unit assembly 20 according to the first embodiment is configured such that the adjacent battery cells 100 have the air-electrode terminal 111 and the negative-electrode terminal 112 facing each other, and such that the air-electrode terminal 111 and the negative-electrode terminal 112, which constitute the pair of connected terminals 110, are directly connected together through welding or other methods. Such a terminal connection structure offers a more simplified wire path than a conventional structure using a wire cord, thus improving a possible wire break and a possible short circuit. This terminal connection structure also improves the workability of terminal connection.

Structure of Metal-Air Battery Module

Figure 9:
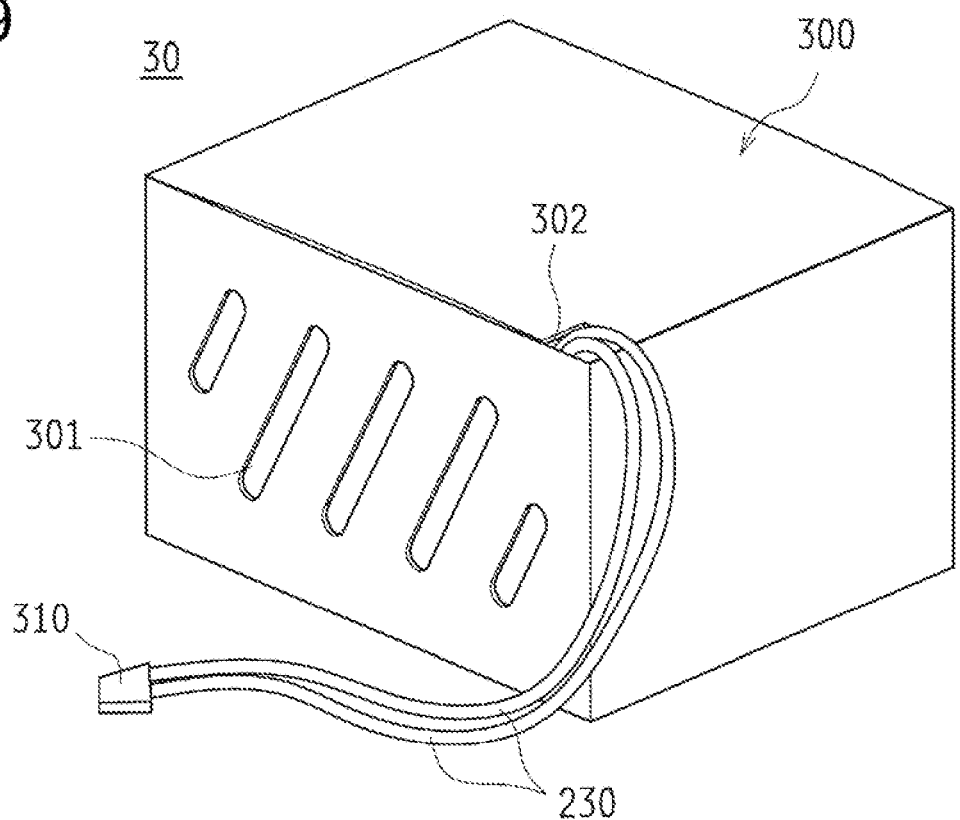
FIG. 9 is a perspective view of a metal-air battery module according to the first embodiment.
Figure 10:
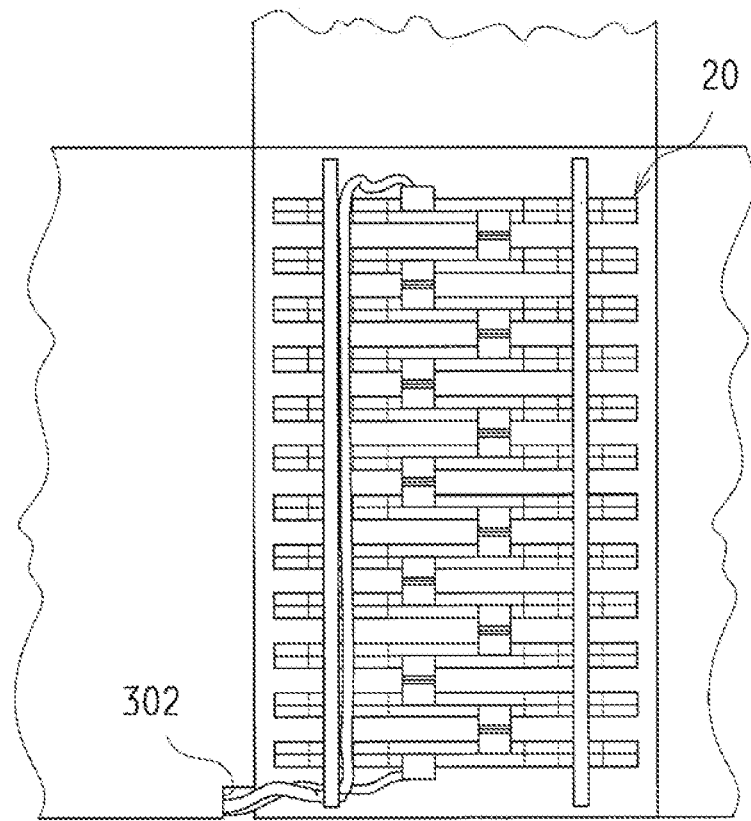
FIG. 10 is a plan view of the inside of the metal-air battery module in FIG. 9 viewed from above.

FIG. 9 is a perspective view of the metal-air battery module 30 (with the lid of a casing 300 being closed) according to the first embodiment. FIG. 10 is a plan view of the inside of the metal-air battery module 300 (with the lid of the casing 300 being open) viewed from above. The metal-air battery module 30 is configured such that the aforementioned unit assembly 20 is housed in the casing 300, which is a box, and such that only the wire cords 230 extend out of the casing 300. The casing 300 is made of any material; a lightweight material having appropriate strength is preferable. The casing 300 can be made of, but not limited to, plastic or paper (cardboard); plastic is preferably used when water resistance is particularly required.

To avoid a backlash inside the casing 300, the unit assembly 20 is preferably configured such that the outer dimension (height×width×depth) of the unit assembly 20 is the same as the inner dimension (height×width×depth) of the casing 300. This enables the coupling between the battery units 10 and the first couplers 210 to be stably maintained in the unit assembly 20 inside the metal-air battery module 30.

The casing 300 has ventilation holes 301 provided for injecting or ejecting air. The ventilation holes 301 are disposed on two side surfaces of the casing 300 facing each other; specifically, the ventilation holes 301 are disposed on two side surfaces parallel to the direction where the battery units 10 are arranged inside the casing 300. Accordingly, the ventilation holes 301 can efficiently supply air to an air path between the adjacent battery units 10.

Although each ventilation hole 301 may have any shape, the ventilation hole 301 preferably have such a shape as not to reduce the strength of the casing 300 more than necessary. For instance, the ventilation hole 301 can have a slit shape or a dot shape. FIG. 9 illustrates, by way of example, the ventilation holes 301 in the form of oblique slits.

The casing 300 has a cord outlet 302 for passing the wire cords 230, connected to the inside unit assembly 20, to the outside. The cord outlet 302 is preferably disposed at one of the corners of the casing 300; to be specific, the cord outlet 302 is preferably disposed at a corner close to one of the power-extraction terminals, which are connected to the wire cords 230 in the unit assembly 20 within the casing 300. In this case, a plurality of wire cords 230 extend out of a single cord outlet 302. The metal-air battery module 30 may have a connector 310, which is used for circuit connection, connected at the distal ends of the wire cords 230 extending outside the casing 300.

The wire cords 230 within the casing 300 are preferably routed using, for instance, a space provided for an air path. The metal-air battery module 30 is preferably configured such that each component (the sheets 130 and the first couplers 210) of the unit assembly 20 are disposed so as to be in contact with the inner wall surfaces of the casing 300; in this case, there is no excess space between the unit assembly 20 and the casing 300. Hence, the spaces between the components of the unit assembly 20 constitute air paths for supplying air to the battery cells 100. The wire cords 230 within the casing 300 are preferably routed using such spaces between the components of the unit assembly 20.

As illustrated in FIG. 5 for instance, the wire cord 230 connected to one of the power-extraction terminals that is located close to the cord outlet 302 can be routed so as to pass under the end of the first coupler 210 disposed between the power-extraction terminal and the cord outlet 302. Further, the wire cord 230 connected to the other power-extraction terminal located away from the cord outlet 302 can be routed so as to extend along a space formed by the chamfered portion 132a of the second cut 132. The power-extraction terminals connected to the wire cords 230 at this time may be bent downward from the first cut 131 of the battery unit 10 in order to facilitate such routing of the wire cords 230.

Modification

Figure 11:
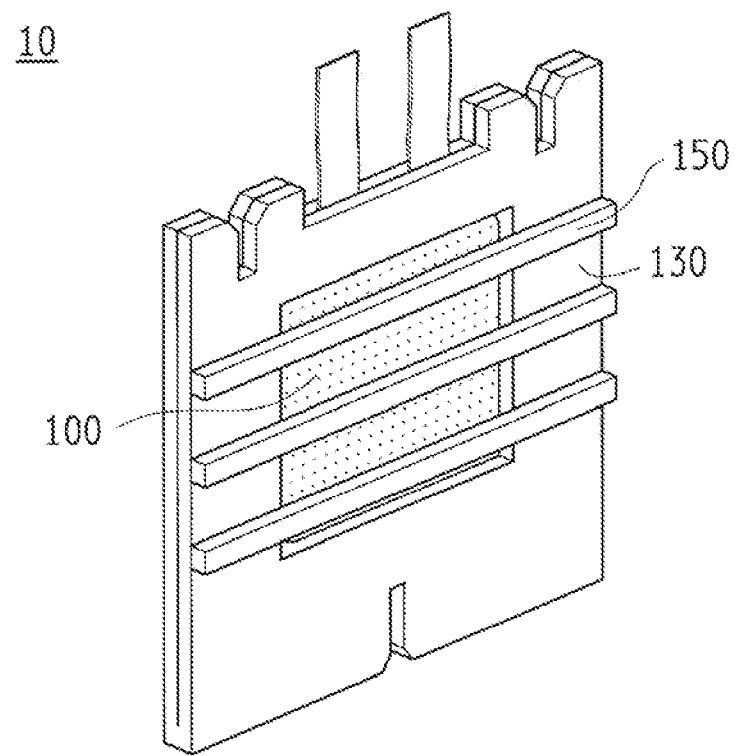
FIG. 11 is a perspective view of a battery unit in a modification.

As illustrated in FIG. 11, each battery unit 10 may have at least one horizontal rail 150 (three horizontal rails in FIG. 3) on one of its surfaces. This horizontal rail 150 regulates the gap between the adjacent battery units 10 in the unit assembly 20, and effectively allocates a path for supplying air to the battery unit 10. Each battery cell 100, when being a secondary battery in particular, expands in some cases resulting from repeated charge and discharge; the horizontal rail 150 prevents such expansion of the battery cell 100, and avoids the air path (the gap between the battery units 10) from being narrowed. Preventing the expansion of the battery cell 100 can increase the capacity of discharge as well. The horizontal rail 150 is preferably disposed along the flow of air coming from the ventilation holes 301, which are disposed on both side surfaces of the casing 300, so that the air from the ventilation holes 301 can be guided to the opening 134 of the battery unit 10. Here, attaching the horizontal rail 150 to the surface of the battery unit 10 before assembling the unit assembly 20 facilitates the assembly of the unit assembly 20.

Second Embodiment

Figure 12:
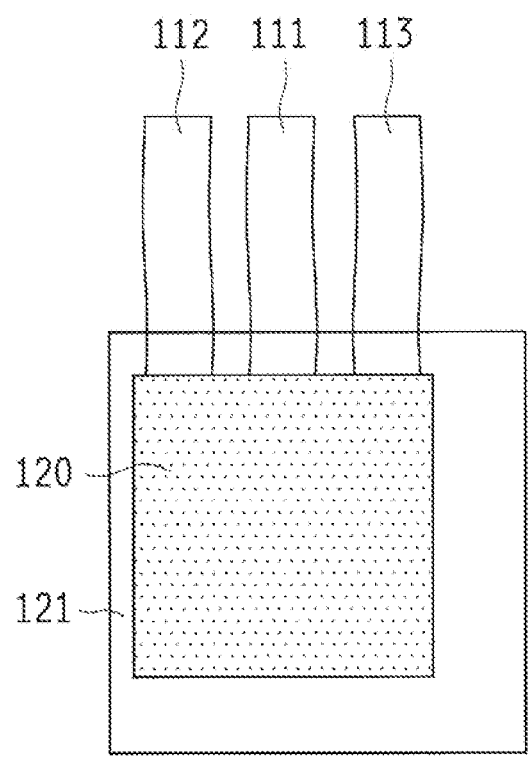
FIG. 12 is a plan view of the appearance of a three-electrode system-based battery cell.

The first embodiment has described, by way of example, a configuration where the two-electrode system-based battery unit 10 is sandwiched by the sheet 130. The battery unit 10 in the present disclosure is not limited to this configuration; FIG. 12 illustrates a possible configuration where a three-electrode system-based metal-air battery cell 140 (hereinafter merely referred to as a battery cell 140) is sandwiched by the sheet 130.

Figure 13:
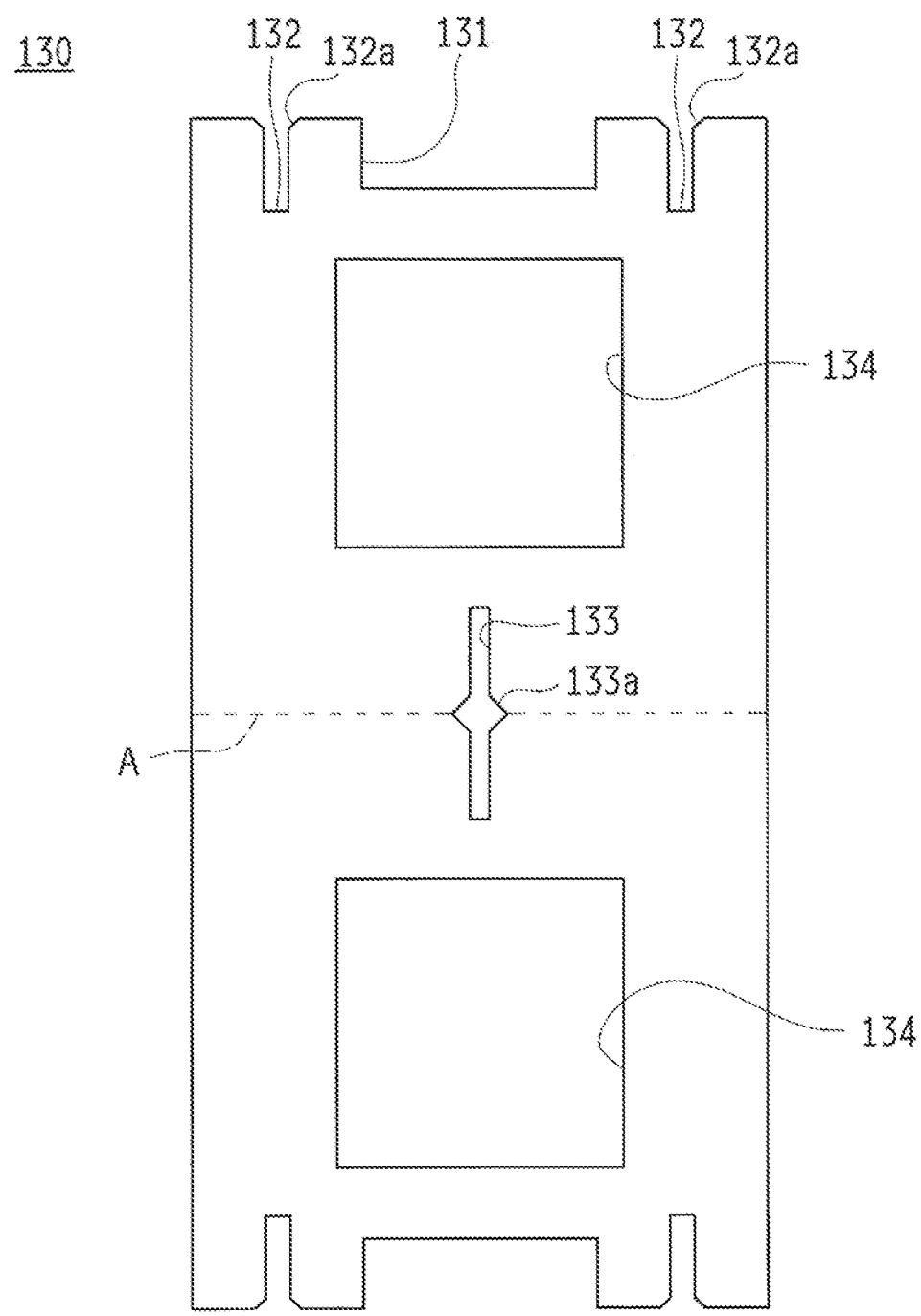
FIG. 13 is a developed view of a sheet before being folded, included in a battery unit using the three-electrode system-based battery cell.

FIG. 12 is a plan view of the appearance of the three-electrode system-based battery cell 140. FIG. 13 is a developed view of the sheet 130 before being folded, used in a three-electrode system.

Like the battery cell 100 in FIG. 3, the battery cell 140 is a laminated metal-air battery cell having the welded region 121 around the laminated region 120. The three-electrode system-based battery cell 140 has a charge-electrode terminal 113 as well as the air-electrode terminal 111 and the negative-electrode terminal 112. These terminals protrude outside further than the welded region 121, on one side (in FIG. 12, the upper side) of the battery cell 140. That is, the air-electrode terminal 111, the negative-electrode terminal 112, and the charge-electrode terminal 113 are foil electrode terminals extending so as to protrude outside from one side of the battery cell 140. These terminals are arranged in such a manner that the air-electrode terminal 111 is in the middle, and the negative-electrode terminal 112 and the charge-electrode terminal 113 are both sides of the air-electrode terminal 111. Since a three-electrode system-based metal-air battery is publicly known, the inner structure of the battery cell 140 will not be elaborated upon.

As illustrated in FIG. 13, the sheet 130 according to the second embodiment has two openings 134 provided for a single battery cell 140, and facing each other when the sheet 130A is folded along a folding line A. When the sheet 130 supports the battery cell 140, one of the two openings 134 faces a surface on which the air electrode of the battery cell 140 is disposed, and this opening 134 is used for supplying air to the battery cell 140. The other opening 134 faces a surface on which the charge electrode of the battery cell 140 is disposed, and this opening 134 is used for discharging gas (e.g., oxygen) from the battery cell 140. The sheet 130 in FIG. 13 is also applicable to a metal-air battery having a negative electrode sandwiched by two air electrodes.

The battery cell 140 is configured such that a load is connected between the air-electrode terminal 111 and the negative-electrode terminal 112 during discharge, and such that a voltage is applied between the negative-electrode terminal 112 and the charge-electrode terminal 113 during charge. Whereas the air-electrode terminal 111 is separated from a current path during charge in order to prevent degradation, as illustrated in FIG. 14(*a*), the charge-electrode terminal 113 may be connected to the current path regardless of during charge/discharge, as illustrated in FIGS. 14(*a*) and (*b*).

Although not shown, the battery unit 10 and the unit assembly 20 according to the second embodiment are configured in a manner similar to that in the battery unit 10 and the unit assembly 20 according to the first embodiment. That is, the battery unit 10 according to the second embodiment can use the sheet 130 similar to that in the battery unit 10 according to the first embodiment; the battery cell 140 is sandwiched by the sheet 130, thus forming the battery unit 10. Nevertheless, the three terminals (the air-electrode terminal 111, the negative-electrode terminal 112, and the charge-electrode terminal 113) of the battery cell 140 are disposed at the first cut 131. Like the unit assembly 20 according to the first embodiment, the unit assembly 20 according to the second embodiment includes a plurality of battery units 10 connectable together with the first couplers 210.

Figure 15:
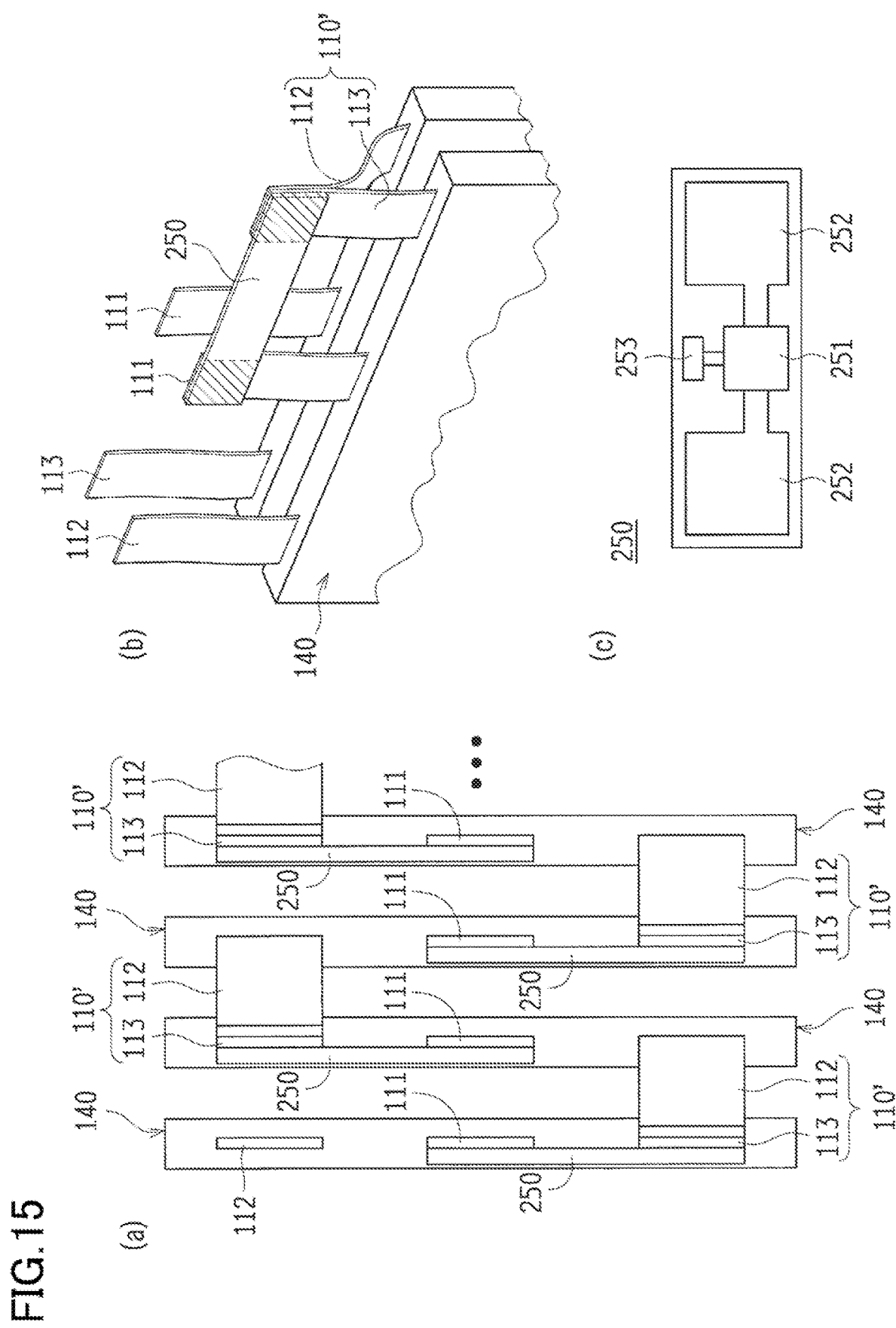
FIG. 15 illustrates a structure of connected terminals in a unit assembly according to a second embodiment.

Since the battery cell 140 is based on a three-electrode system, the unit assembly 20 according to the second embodiment is different from the unit assembly 20 according to the first embodiment in the configuration of terminal connection. The configuration of terminal connection according to the second embodiment will be described with reference to FIG. 15. FIG. 15(*a*) is a plan view of a plurality of battery cells 140 connected in series, viewed from where the terminals are disposed. FIG. 15(*b*) is a perspective view of a connection between the terminals of the two adjacent battery cells 140. FIG. 15(*c*) illustrates a configuration of a connection substrate 250 used for connecting the battery cells 140. Herein, the sheet 130 and the first couplers 210 are not shown in FIG. 15.

In the unit assembly 20 according to the second embodiment, the arrangement of the negative-electrode terminal 112 and charge-electrode terminal 113 is reverse between the adjacent battery units 10. That is, the charge-electrode terminal 113 of one of the battery units 10 faces the negative-electrode terminal 112 of the other battery unit 10, and the negative-electrode terminal 112 of one of the battery unit 10 faces the charge-electrode terminal 113 of the other battery unit 10. The charge-electrode terminal 113 and negative-electrode terminal 112 facing each other in such a manner, which are close to each other, can be directly connected together through welding or other methods, without using a wire cord. That is, the charge-electrode terminal 113 and the negative-electrode terminal 112 are connected, thus constituting a pair of connected terminals 110' between the adjacent battery units 10.

In such a unit assembly 20, the negative-electrode terminal 112 of the battery unit 10 in the $(2i)^{th}$ place counted from one of the ends of the row is connected to the charge-electrode terminal 113 of the battery unit 10 in the $(2i-1)^{th}$ place; in this case, the negative-electrode terminal 112 of the battery unit 10 in the $(2i+1)^{th}$ place counted from the end is connected to the charge-electrode terminal 113 of the battery unit 10 in the $(2i)^{th}$ place (herein, the alphabet i is equal to 1, 2, 3 . . . ). In other words, in a battery-cell row including a plurality of battery cells 140 connected in series, the negative-electrode terminal 112 of one of two adjacent battery cells 140 that is upstream of current is connected to the charge-electrode terminal 113 of the other battery cell 100 downstream of current, thus constituting the pair of connected terminals 110' (this is because that inside a battery, current flows from the negative electrode toward the positive electrode). Such terminal connection enables the unit assembly 20 according to the second embodiment to include pairs of connected terminals 110' each consisting of the connected negative-electrode terminal 112 and charge-electrode terminal 113, and alternately arranged on the right and left. Furthermore, in each battery unit 10, the air-electrode terminal 111 is connected to the charge-electrode terminal 113 via the connection substrate 250. The battery units 10 of the unit assembly 20 are accordingly connected in series.

The negative-electrode terminal 112 of the battery unit 10 at one end of the unit assembly 20 and the charge-electrode terminal 113 of the battery unit 10 at the other end do not form pairs of connected terminals 110'; these terminals are connected to the wire cords 230, thus constituting terminals for extracting power from the unit assembly 20. These power-extraction terminals also serve as charge terminals used in charging the battery cells 140.

The connection substrate 250 is a printed board on which a switching element 251, two connection terminals 252, and a control-input terminal 253 are mounted, as illustrated in FIG. 15(c). In the connection substrate 250, the two connected terminals 252 are arranged with the switching element 251 interposed therebetween; in addition, one of the connection terminals 252 is connected to the air-electrode terminal 111, and the other connection terminal 252 is connected to the charge-electrode terminal 113. It is noted that referring to the connection with the charge-electrode terminal 113, the connection substrate 250 needs to be connected to the pair of connected terminals 110' including the charge-electrode terminal 113, and may be hence connected to the negative-electrode terminal 112, together with the charge-electrode terminal 113, constituting the pair of connected terminals 110'. It is also noted that welding or other methods can be suitably used in terminal connection between the connection substrate 250 and the battery cell 140 as well.

The switching element 251 is connected to the control-input terminal 253. The switching element 251 switches between ON and OFF in response to control signals supplied from the control-input terminal 253. The switching element 251 remains OFF during the charge of the battery cell 140 and separates the air-electrode terminal 111 from a current path; FIG. 14(a) illustrates this state. The switching element 251 in contrast remains ON during the discharge of the battery cell 140, and connects the air-electrode terminal 111 to the current path; FIG. 14(b) illustrates this state.

The control-input terminal 253 of the connection substrate 250 is connected to a control wire (wire cord), not shown, from which the control signals are input. It is noted that the control-input terminals 253 of all the connection substrates 250 may be connected to the same control wire, and that the switching elements 251 of all the connection substrates 250 may be simultaneously turned ON and OFF.

Although not shown, the metal-air battery module 30 according to the second embodiment is basically configured in a manner almost similar to that in the metal-air battery module 30 according to the first embodiment. That is, the metal-air battery module 30 according to the second embodiment can be configured by housing the unit assembly 20 according to the second embodiment into the casing 300 shown in FIG. 9.

Third Embodiment

The first and second embodiments have described, by way of example, a configuration where a single battery unit 10 or 140 is sandwiched by a single sheet 130. The present disclosure is not limited to this configuration; in a possible configuration, a plurality of battery cells are sandwiched by a single sheet, thus constituting a battery unit.

Figure 16:
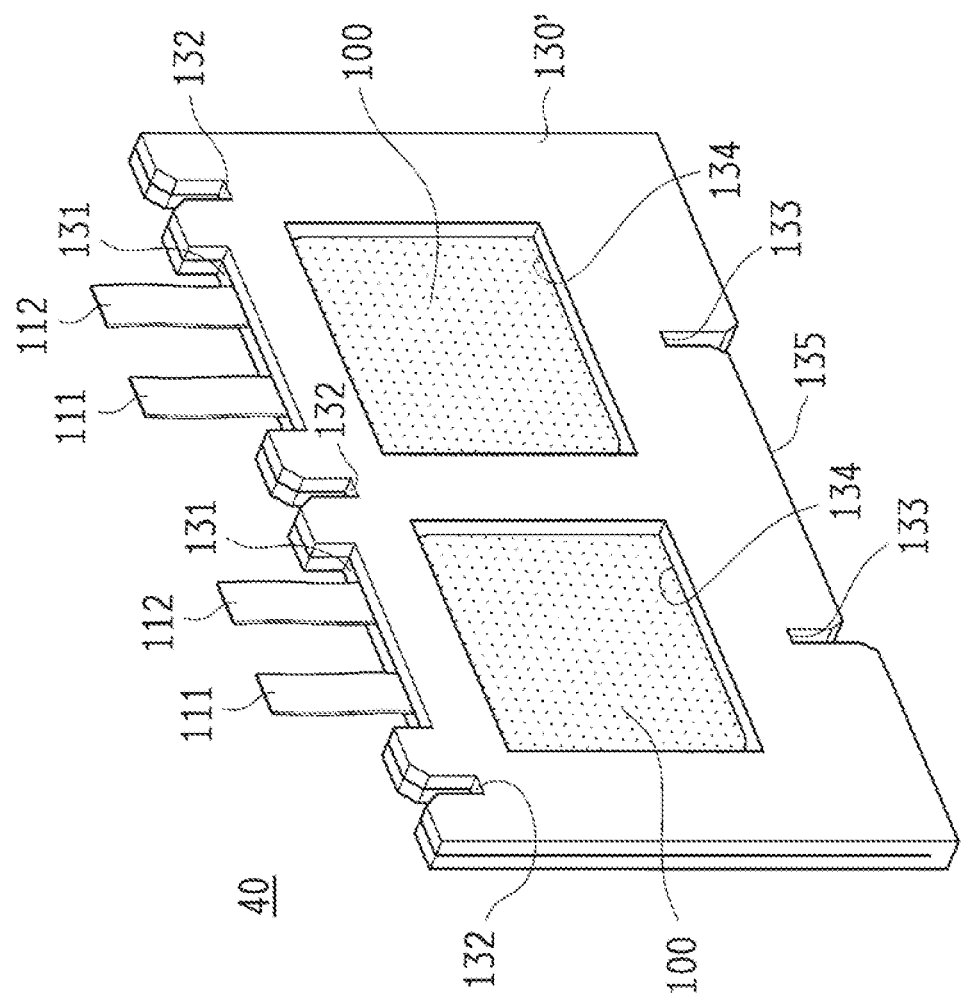
FIG. 16 is a perspective view of a battery unit according to a third embodiment.
Figure 17:
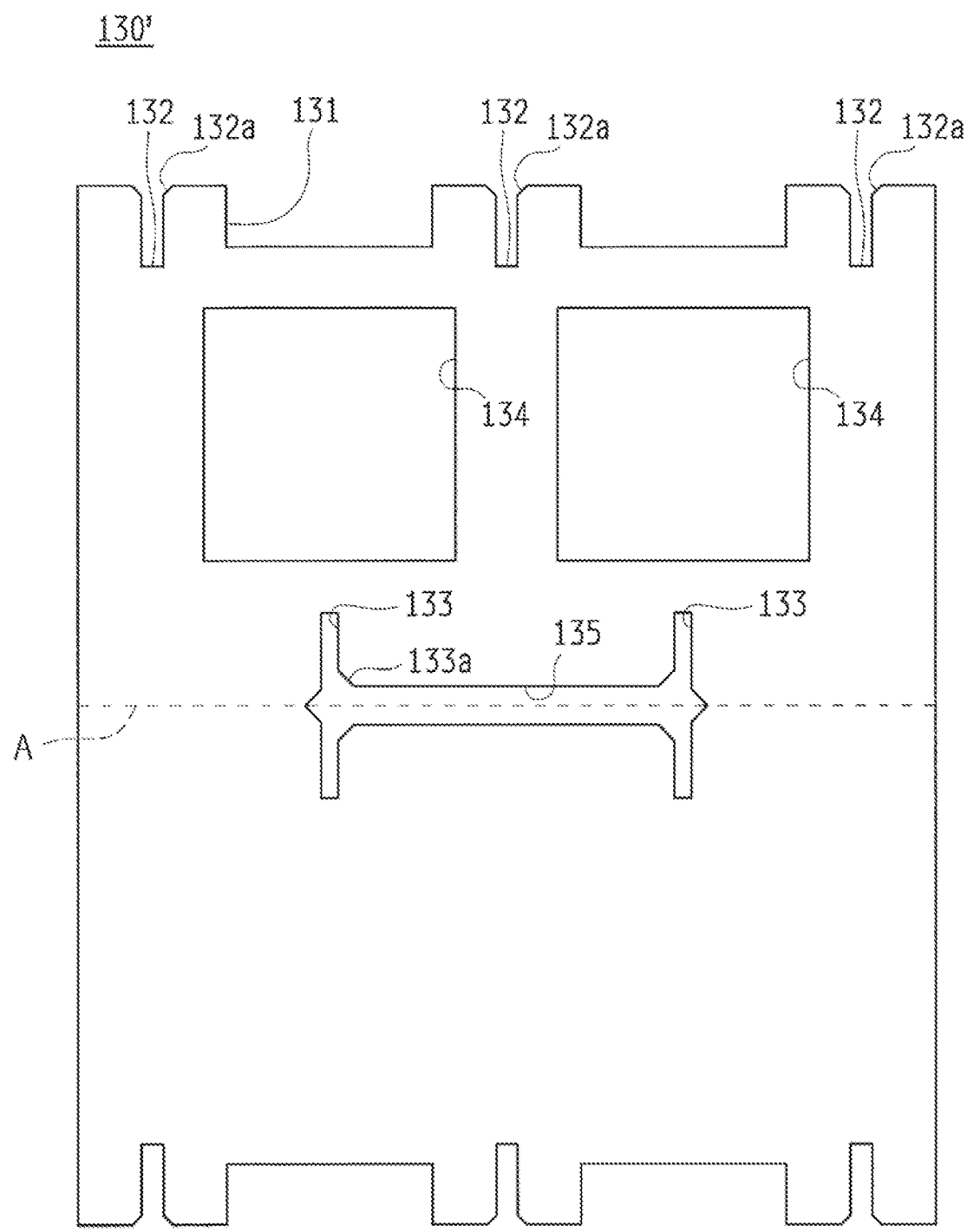
FIG. 17 is a developed view of a sheet before being folded, included in the battery unit in FIG. 16.

FIG. 16 is a perspective view of a battery unit 40 according to the third embodiment. The battery unit 40 includes two battery cells 100 sandwiched by a single sheet (retainer) 130' folded into half. FIG. 17 is a developed view of the sheet 130' before being folded. The configuration of the battery unit 40 according to the third embodiment is not limited to what is illustrated in FIG. 16. For instance, the number of battery cells 100 included in a single battery unit 40 is not limited to two; three or more battery cells 100 may be included.

Figure 18:
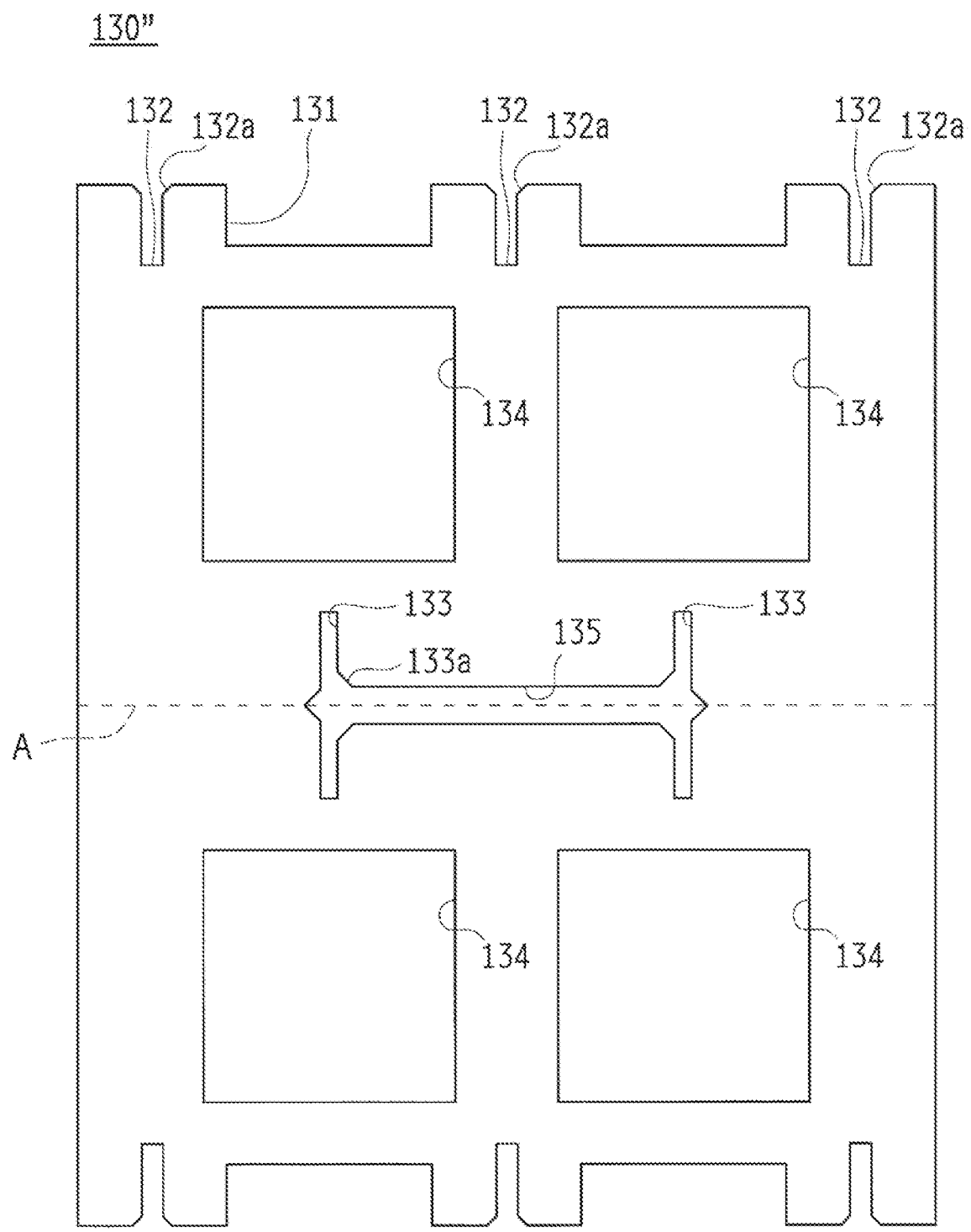
FIG. 18 is a developed view of a sheet before being folded, included in a battery unit using a three-electrode system-based battery cell.

The battery cells included in the battery unit 40 may be the three-electrode system-based battery cells 140 instead of the two-electrode system-based battery cells 100. When the three-electrode system-based battery cell 140 is used, a sheet 130" in FIG. 18 is used instead of the sheet 130' in FIG. 17. The sheet 130" has two openings 134 provided for a single battery cell 140, and facing each other when the sheet 130" is folded. One of the two facing openings 134 faces the air electrode of the battery cell 140, and the other opening 134 faces the charge electrode of the battery cell 140. The sheet 130" in FIG. 18 is also applicable to a metal-air battery having a negative electrode sandwiched by two air electrodes.

In the battery unit 40 according to the third embodiment (the following describes an instance where the two-electrode system-based battery cells 100 are used), the sheet 130' has the first cuts 131 disposed in two different locations so as to correspond to the two battery cells 100, and the openings 134 disposed in two different locations so as to correspond to the two battery cells 100. The two first cuts 131 are disposed on the same side (in FIG. 16, the upper side) of the battery unit 40, and the terminals (the air-electrode terminals 111 and the negative-electrode terminals 112) of each of the two battery cells 100 extend from the same side (in FIG. 16, the upper side) of the battery unit 40.

The battery unit 40 has second cuts 132 in three different locations, that is, in the middle and near both ends of the upper side of the sheet 130'. The battery unit 40 has third cuts 133 in two locations, that is, under the openings 134 on the lower side of the sheet 130'.

Figure 19:
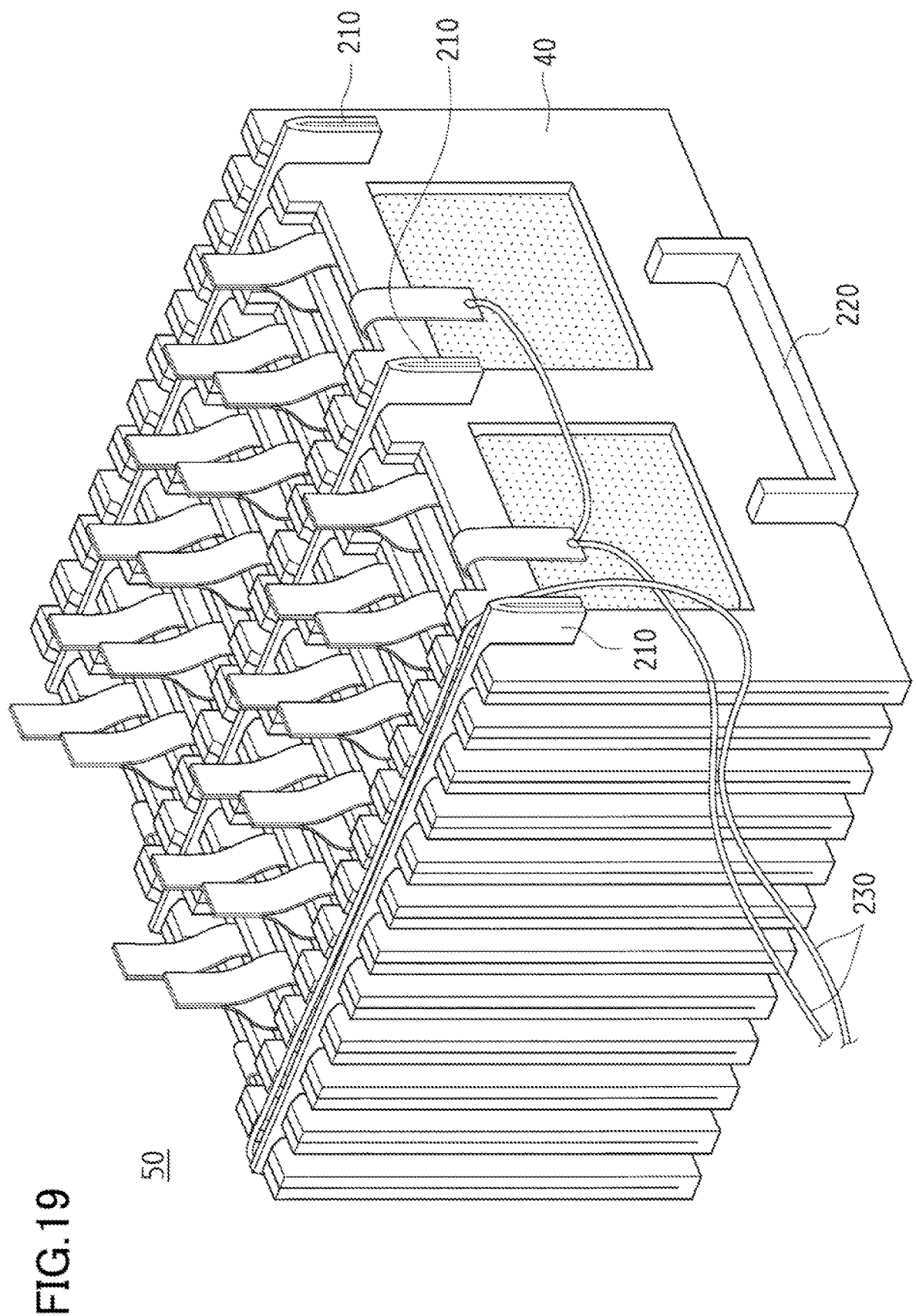
FIG. 19 is a perspective view of the structure of a unit assembly according to the third embodiment.

FIG. 19 is a perspective view of the structure of a unit assembly 50 according to the third embodiment. The unit assembly 50 in FIG. 19 couples a plurality of battery units 40 using three first couplers 210 and a single second coupler (coupler) 220. That is, in the unit assembly 50, the three first couplers 210 couple the battery units 40 on the upper side, and the single second coupler 220 couples the battery units 40 on the lower side, as illustrated in FIG. 19.

Figure 20:
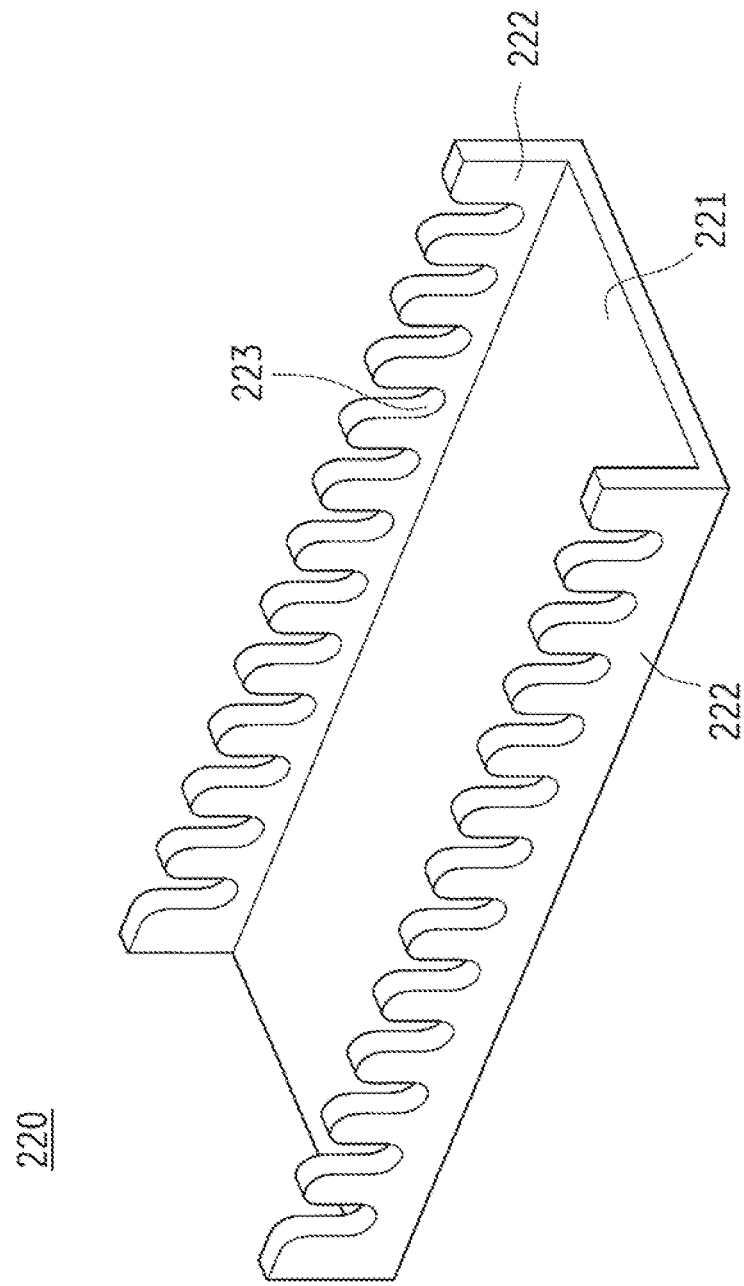
FIG. 20 is a perspective view of a second coupler used in the unit assembly in FIG. 19.

The second coupler 220 used in the unit assembly 50 can be a single sheet (e.g., a foamable resin sheet) folded along two locations to form a U-shape in cross-section, as illustrated in FIG. 20. The second coupler 220 consists of a bottom plate 221 and two side plates 222, and has a plurality of groove-shaped fifth cuts 223 in the form of comb teeth arranged at predetermined intervals along one side in the longer-side direction of the side plates 222. This enables the fifth cuts (second cuts for coupling) 223 of the second coupler 220 to be fitted into the third cuts (first cuts for coupling) 133 of the battery unit 40 on the lower side of the battery unit 40. When such a second coupler 220 is used, the battery unit 40 preferably has, on its lower side, a sixth cut 135 (see FIG. 16) disposed between the third cuts 133 and corresponding to the thickness of the bottom plate 221 of the second coupler 220. The sixth cut 135 is disposed on the lower side of the battery unit 40, thereby enabling the lower side of the sheet 130' and the lower surface of the second coupler 220 to be flush on the lower surface of the unit assembly 50.

As described, the unit assembly 50 according to the third embodiment, which includes the battery units 40 each holding the plurality of battery cells 100 using a single sheet 130', facilitates forming of a plurality of battery-cell rows within a limited space. This configuration improves the workability of assembling the unit assembly 50 that includes many battery cells 100.

In the unit assembly 50 in FIG. 19, two battery cells 100 are included in a single battery unit 40, thus providing two battery-cell rows; the connection methods described in the first embodiment are applied to terminal connection in each battery-cell row. As a matter of course, the connection method described in the second embodiment is applied when the battery cells 140 are used in the battery unit 40. These battery-cell rows can be connected in parallel as well as in series by connecting the power-extraction terminals (the air-electrode terminal 111 or negative-electrode terminal 112 not forming the pair of connected terminals 110) and the wire cords 230.

FIG. 21 illustrates how to connect the wire cords 230 when the two battery-cell rows are connected in parallel. FIG. 21(*a*) illustrates one end of the battery-cell rows, and FIG. 21(*b*) illustrates the other end of the battery-cell rows. To be specific, at the one end in FIG. 21(*a*), terminals of the same polarity (in the drawing, the air-electrode terminals 111) belonging to the respective battery-cell rows are power-extraction terminals; these terminals are connected together by a wire cord 230*a*, and a wire cord 230*b* (a drawn wire close to the positive electrode) is connected to one of the terminals. At the other end in FIG. 21(*b*), terminals of the same polarity (in the drawing, the negative-electrode terminals 112) belonging to the respective battery-cell rows are power-extraction terminals; these terminals connected together by a wire cord 230*c*, and a wire cord 230*d* (a drawn wire close to the negative electrode) is connected to one of the terminals.

FIG. 22 illustrates how to connect the wire cords 230 when the two battery-cell rows are connected in series. FIG. 22(*a*) illustrates one end of the battery-cell rows, and FIG. 22(*b*) illustrates the other end of the battery-cell rows. To be specific, at the one end in FIG. 22(*a*), terminals of different polarities belonging to the respective battery-cell rows are power-extraction terminals; a wire cord 230*e* (a drawn wire close to the positive electrode) is connected to the power-extraction terminal (air-electrode terminal 111) of one of the battery-cell rows, and a wire cord 230*f* (a drawn wire close to the negative electrode) is connected to the power-extraction terminal (negative-electrode terminal 112) of the other battery-cell row. At the other end in FIG. 22(*b*), power-extraction terminals of different polarities belonging to the respective battery-cell rows are connected together by a wire cord 230*g*.

Although not shown, the metal-air battery module 30 according to the third embodiment is basically configured in a manner almost similar to that in the metal-air battery module 30 according to the first embodiment. That is, the metal-air battery module 30 according to the third embodiment is configured by housing the unit assembly 50 according to the third embodiment into the casing 300 shown in FIG. 9.

Modification

Although the battery units 10 and 40 in the foregoing embodiments are configured such that the battery cell 100 or 140 is sandwiched by the sheet 130, the present disclosure is not limited to this configuration. For instance, a plastic case or other types of casing may be used instead of the sheet 130, and the battery cell 100 (or battery cell 140) may be inserted into the plastic case, thus forming a battery unit. Such a plastic case needs to have the same shape in a plan view as the sheet 130 folded, and the case needs to have one side (e.g., the upper side) provided with an opening, from which the battery cell 100 (or battery cell 140) is inserted.

Fourth Embodiment

The battery module 30 according to the first embodiment includes the battery units 10 each having the battery cell 100 sandwiched by the sheet 130. The battery units 10 are coupled by the first couplers 210 and the second coupler 220, thus forming the unit assembly 20. The unit assembly 20 is housed into the casing 300, thus forming the battery module 30. That is, the sheets 130, the first couplers 210, and the second coupler 220 keep the battery cells 100 in a predetermined position. The present invention is not limited to this configuration; in some embodiments, the casing of the battery module can keep the battery cells 100 in a predetermined position.

Figure 23:
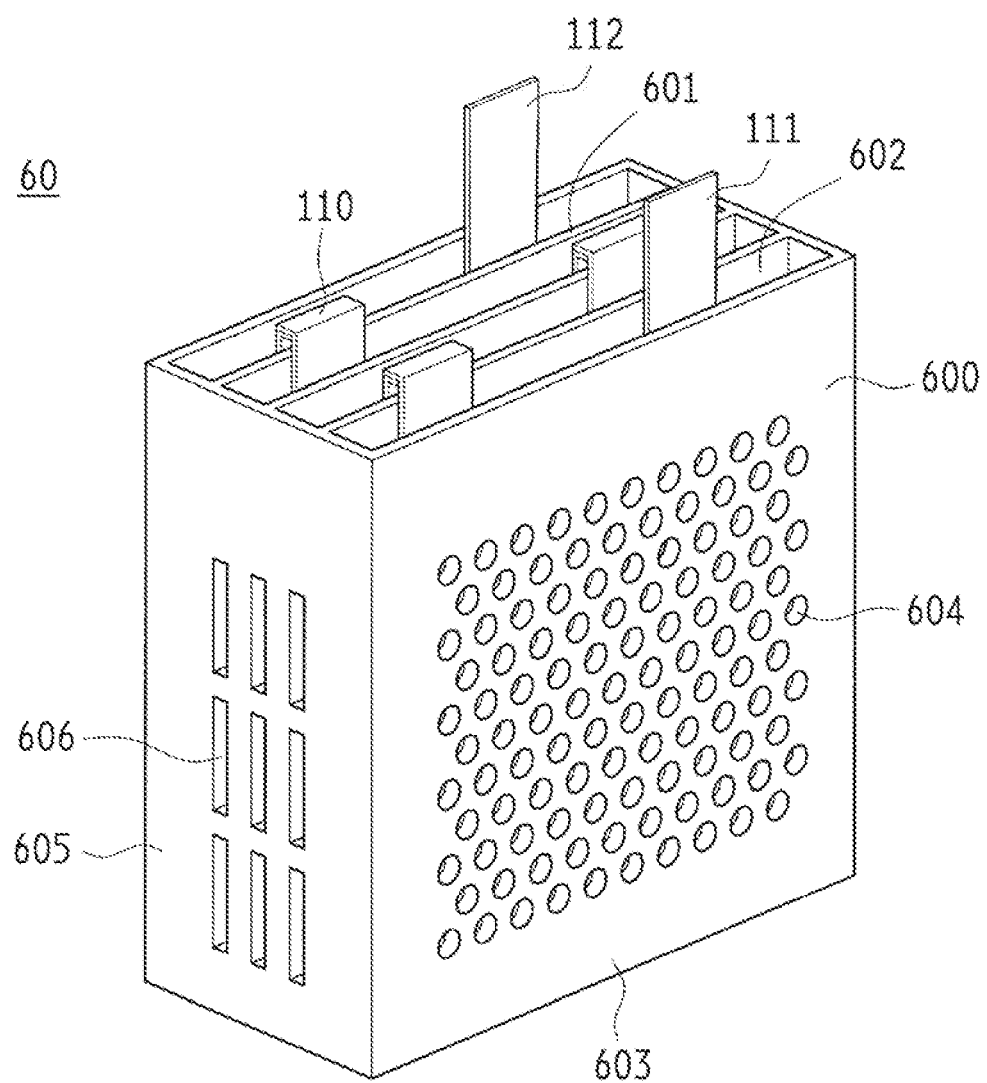
FIG. 23 is a perspective view of a metal-air battery module according to a fourth embodiment.

FIG. 23 is a perspective view of a metal-air battery module 60 according to a modification of the present disclosure. By way of example, the metal-air battery module 60 retains the plurality of battery cells 100 using, for instance, a plastic casing 600. The casing 600 incorporates partition plates (partition walls) 601, thus sectioning its inside into a plurality of battery-cell housing chambers 602. FIG. 23 illustrates, by way of example, that there are three partition plates 601, thus providing four battery-cell housing chambers 602; any number of chambers may be provided.

A single battery cell 100 is housed in each battery-cell housing chamber 602, and these battery cells 100 housed in the battery-cell housing chambers 602 are thus kept in a predetermined position. Each terminal (the air-electrode terminal 111 and the negative-electrode terminal 112) of the battery cell 100 is exposed from the opening, a cell housing port, of the battery-cell housing chamber 602, to be capable of forming the pair of connected terminals 110.

The casing 600 has ventilation holes 604 on a side plate 603 facing the air electrode of the battery cell 100, and on the partition plates 601. The ventilation holes 604 are provided for supplying air to the air electrodes. The casing 600 also has ventilation holes 606 disposed on two side plates 605 orthogonal to the partition plates 601 and facing each other. The ventilation holes 606 are provided for supplying air to the inside of the battery-cell housing chambers 602. That is, the battery cells 100 within the battery-cell housing chambers 602 can be supplied with air via the ventilation holes 604 and 606.

The metal-air battery module 60 according to the fourth embodiment can keep the plurality of battery cells 100 in a predetermined position by using only the casing 600 without using the sheets 130, the first couplers 210, and the second coupler 220. This can offer a module having reduced number of components. Although FIG. 23 illustrates, by way of example, a configuration where the two-electrode system-based battery cells 100 are used, the three-electrode system-based battery cells 140 may be used.

The disclosed embodiments are illustrative in all aspects and do not constitute a ground for limited interpretations. The technical scope of the present disclosure is thus defined by the appended claims rather than by only the foregoing embodiments. In addition, all changes that fall within metes and bounds of the claims, or equivalence of such metes and bounds thereof are embraced by the claims.

INCORPORATION BY REFERENCE

The present application claims priority to Japanese Patent Application Nos. 2018-163005, 2018-163008 and 2018-163009, filed on Aug. 31, 2018, the entire disclosures of which are incorporated herein by reference.

The invention claimed is:

1. A metal-air battery module comprising:
at least one battery-cell row including a plurality of metal-air battery cells connected in series;
a casing housing the plurality of metal-air battery cells;
a plurality of retainers being separate bodies from the casing and the plurality of metal-air battery cells, the plurality of retainers housed in the casing and retaining the plurality of metal-air battery cells; and
a coupler being a separate body from the casing and the plurality of metal-air battery cells, the coupler housed in the casing and coupling the plurality of retainers,
wherein each of the plurality of metal-air battery cells is a two-electrode system-based metal-air battery having a negative-electrode terminal and an air-electrode terminal,
in the at least one battery-cell row, two of the plurality of metal-air battery cells adjacent to each other are arranged in such a manner that the negative-electrode terminal and the air-electrode terminal face each other,
in the two of the plurality of metal-air battery cells adjacent to each other, the negative-electrode terminal of one metal-air battery cell is connected to the air-electrode terminal of the other metal-air battery cell to constitute a pair of connected terminals,
the negative-electrode terminal and the air-electrode terminal of the pair of connected terminals are directly connected,
the plurality of retainers has first cuts for coupling,
the coupler has a plurality of second cuts for coupling, and
the plurality of second cuts for coupling is fitted into the first cuts for coupling to provide a gap between two of the plurality of retainers adjacent to each other.

2. The metal-air battery module according to claim 1, further comprising:
a wire cord connected to the at least one battery-cell row and extending to an outside of the casing,
wherein the wire cord within the casing is routed using a space disposed between the plurality of retainers and the coupler.

3. The metal-air battery module according to claim 1, wherein
each of the plurality of retainers comprises a single sheet folded to sandwich and support a corresponding one of the plurality of metal-air battery cells, and has a first opening in a location overlapping the air-electrode of the corresponding one of the plurality of metal-air battery cells.

4. The metal-air battery module according to claim 1, wherein
the at least one battery-cell row comprises two battery-cell rows, and
the plurality of retainers retains two or more of the plurality of metal-air battery cells included in the two battery-cell rows.

5. The metal-air battery module according to claim 1, wherein
the pair of connected terminals is welded together.

6. The metal-air battery module according to claim 1, wherein
the pair of connected terminals is integrally bent.

7. The metal-air battery module according to claim 1, wherein
in the pair of connected terminals, one connected terminal has a bent portion overlapping a bent portion of another connected terminal.

8. The metal-air battery module according to claim 1, wherein
the pair of connected terminals has an overlap portion covered with an insulating material.

9. The metal-air battery module according to claim 1, wherein
the plurality of retainers comprises foamable resin sheets made of a porous material.

10. The metal-air battery module according to claim 1, wherein
the plurality of metal-air battery cells comprises three-electrode system-based metal-air batteries,
each of the plurality of retainers comprises a single sheet folded to sandwich and support a corresponding one of the plurality of metal-air battery cells, and
each of the plurality of retainers has
a first opening in a location overlapping the air-electrode of the corresponding one of the plurality of metal-air battery cells, and
a second opening in a location overlapping a charge-electrode of the corresponding one of the plurality of metal-air battery cells.

11. The metal-air battery module according to claim 1, wherein
the coupler supports an inner wall of the casing.

12. The metal-air battery module according to claim 1, wherein
each of the plurality of retainers has one side provided with a cut for terminal placement, and
each of the plurality of metal-air battery cells has an electrode terminal placed in the cut for terminal placement.

13. The metal-air battery module according to claim 2, wherein
the first cuts of the plurality of retainers comprise one or more cuts on a side of each of the plurality of retainers that is in contact with an inner wall of the casing, and
the wire cord passes through a space disposed between the casing and the one or more cuts.

* * * * *